United States Patent [19]
> Arikawa

[11] Patent Number: 4,740,040
[45] Date of Patent: Apr. 26, 1988

[54] ANTI-SKID CONTROL APPARATUS FOR A VEHICLE BRAKING SYSTEM

[75] Inventor: Tetsuro Arikawa, Kanagawa, Japan

[73] Assignee: Nippon A B S, Ltd., Tokyo, Japan

[21] Appl. No.: 57,802

[22] Filed: Jun. 3, 1987

[30] Foreign Application Priority Data

Jun. 9, 1986 [JP] Japan ................. 61-134665

[51] Int. Cl.⁴ .............. B60T 8/82; B60T 8/64
[52] U.S. Cl. ................... 303/96; 188/181 C;
303/97; 303/98; 303/99; 303/100; 303/111;
303/119; 303/92
[58] Field of Search ............ 97303/111, 100, 113–119,
97303/92, 96, 97, 98, 99, 102, 103, 105,
107–110, DIG. 5, 3–4, 106; 188/181 A, 181 C;
364/426

[56] References Cited

U.S. PATENT DOCUMENTS

| 3,674,317 | 7/1972  | Mangold      | 303/92 X |
| 3,907,377 | 9/1975  | Mayer        | 303/113  |
| 3,980,346 | 9/1976  | Leiber       | 303/6 R  |
| 4,418,966 | 12/1983 | Hattwig      | 303/100  |
| 4,421,362 | 12/1983 | Shirai et al.| 303/115  |
| 4,451,096 | 5/1984  | Gygax        | 303/109  |
| 4,569,560 | 2/1986  | Kubo         | 303/116  |
| 4,637,664 | 1/1987  | Arikawa      | 303/111  |

Primary Examiner—Douglas C. Butler
Attorney, Agent, or Firm—James P. Ryther

[57] ABSTRACT

An anti-skid control vehicle braking apparatus with pairs of front and rear wheels; wheel speed sensors associated with the wheels; first and second fluid pressure control valve devices for respectively controlling the brake fluid pressure of the wheel cylinders of the front wheels; a control unit receiving outputs of the wheel speed sensors for measuring or judging the skid conditions of the front and rear wheels and for generating instructions for controlling the fluid pressure control valve devices; and a valve apparatus for generating a fluid pressure in accordance with the lower one of the brake fluid pressures of the front wheels controlled with the control valve devices, being arranged between the front wheel cylinders and rear wheel cylinders the control unit discriminates the frictionally lower one of the sides of the road on which the wheels are running, on the basis of the measuring or judging results of the skid conditions of rear wheels, combines logically the measuring or judging results of the skid conditions of the rear wheels with the measuring or judging result of the skid condition of one front wheel running on the lower side for generating the instruction for controlling one of fluid pressure control valve devices, and generates the instruction for controlling the other control valve device, on the basis of the measuring or judging result of the skid condition of the other front wheel running on the frictionally higher side independently of those of the rear wheels.

16 Claims, 14 Drawing Sheets

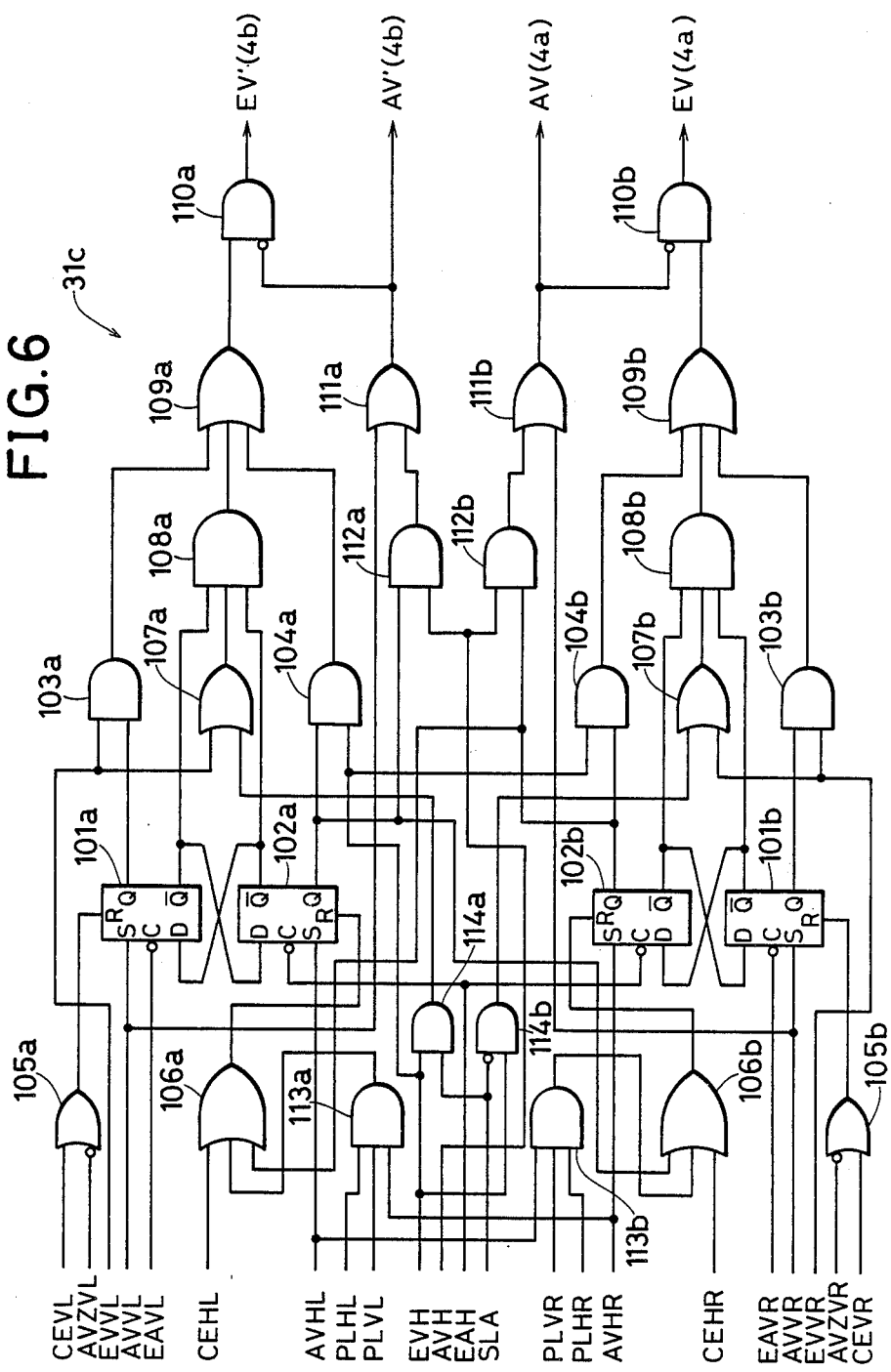

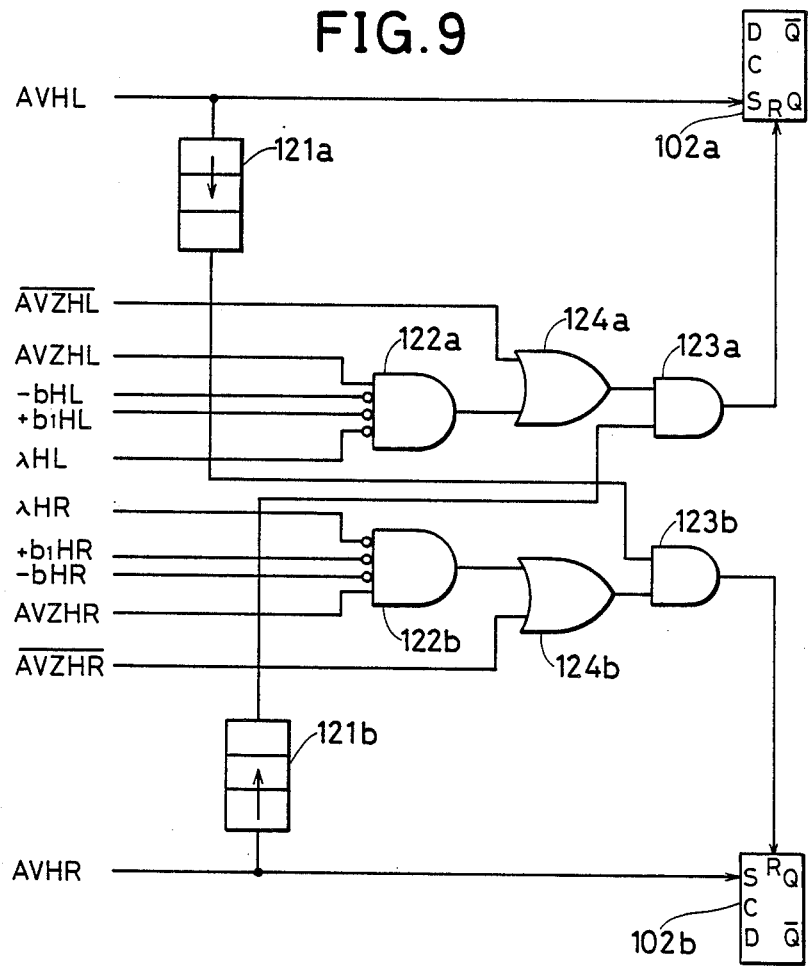

4,740,040

ANTI-SKID CONTROL APPARATUS FOR A VEHICLE BRAKING SYSTEM

BACKGROUND OF THE INVENTION

1. Field of the Invention

This invention relates to an anti-skid control apparatus for a vehicle braking system which can prevent the locking of the wheels.

2. Description of the Prior Art

Such an anti-skid control apparatus for a vehicle braking system is known that includes a fluid pressure control valve device arranged between a master cylinder and a wheel cylinder of a brake for the wheel, said fluid pressure control valve device receiving control signals of a control unit measuring the skid condition of the wheel to control the brake fluid pressure to the wheel cylinder; a hydraulic reservoir which, when the brake fluid pressure to the wheel cylinder is decreased with control of the fluid pressure control valve device, reserves the brake fluid discharged through the fluid pressure control valve device from the wheel cylinder; a pressure fluid supply conduit connecting the master cylinder with the fluid pressure control valve device; and a fluid pump for returning the brake fluid from the hydraulic reservoir into the pressure fluid supply conduit.

When the fluid pressure control valve device is provided for each of four wheels, and the fluid pressure of them are independently controlled, there is no problem on control operation. Or when the fluid pressure control valve device is provided for each of front wheels, and for both of rear wheels in common, there is no problem on control operation. In the latter case, the one common fluid pressure control valve device is controlled on the basis of the lower one of the speeds of the rear wheels.

However, in the above cases, three or four fluid pressure control valve devices are used. Accordingly, the whole anti-skid control apparatus is large-sized, and very heavy. Since the fluid pressure control valve device is expensive, it requires high cost.

For example, it is considered that the brake fluid pressures of the front wheels are controlled by the two fluid pressure control valve devices respectively in the diagonal or X-type conduit system, and the brake fluid pressures of the rear wheels are controlled in common with the front wheels. However, when the vehicle runs on the road, the right and left sides of which are considerably different in frictional coefficient from each other, there is the fear that the one rear wheel being diagonal to the one front wheel on the higher frictional coefficient side is locked. In that case, the steering of the vehicle becomes unstable, and that is very dangerous.

Further, it is considered that proportioning valves are provided for the rear wheels, respectively. However, the brake fluid pressures of the rear wheels increases in proportion to the input fluid pressures to the proportioning valves. The fear of locking cannot be avoided.

Accordingly, in order to provide an anti-skid control apparatus for a vehicle braking system which can be small-sized and light, and can avoid the fear of locking of rear wheels, this applicant previously proposed an anti-skid control apparatus for a vehicle braking system which includes; a fluid pressure control valve device arranged between a master cylinder and a wheel cylinder of a brake for the wheel, said fluid pressure control valve device receiving control signals of a control unit measuring the skid condition of the wheel to control the brake fluid pressure to said wheel cylinder; a hydraulic reservoir which, when the brake fluid pressure to said wheel cylinder is decreased with control of said fluid pressure control valve device, reserves the brake fluid discharged through said fluid pressure control valve device from said wheel cylinder; a pressure fluid supply conduit connecting said master cylinder with said fluid pressure control valve device; and a fluid pump for returning the brake fluid from said hydraulic reservoir into said pressure fluid supply conduit; said fluid pressure control valve device being provided for a pair of front wheels, respectively, a valve apparatus receiving fluid pressures of wheel cylinders of said front wheels being arranged between said pair of front wheels and a pair of rear wheels, and when any one of said fluid pressure control valve devices starts to control, at least the fluid pressure of the one of said rear wheels, being at the same side as the one of said front wheels, the fluid pressure of the wheel cylinder of which is lower, is controlled in accordance with the lower one of the fluid pressures of the wheel cylinders of said front wheels by said valve apparatus.

In the above-described anti-skid control apparatus, the control signals for the control unit are formed by judging the skid conductions of the respective front wheels. On the assumption that the front and rear wheels are provided with the types of the same kind, the braking forces are so distributed to the wheels that the front wheels tend sooner to lock than the rear wheels, when the vehicle is rapidly braked on the road which is uniform in frictional coefficient.

However, when the above assumption is not fulfilled, for example, when only the front wheels are provided with spike tyres or chains for running on a snow or ice road, and the rear wheels are provided with the normal tyres, the rear wheels tend sooner to lock than the front wheels. In the above anti-skid control apparatus, the brake fluid pressure is not controlled with the locking of the rear wheel. When the brake fluid pressure of the front wheel is controlled over the limit locking pressure of the rear wheel, the locking of the rear wheel is not released, and so the steering stability cannot be maintained.

Even in the case that the front and wheels are provided with the tyres of the same kind, the rear wheel may tend sooner to lock than the front wheel, when the frictional coefficient of the brake lining becomes excessively low due to thermal fade phenomenon in a front wheel brake apparatus and the limit lock pressure of the front wheel becomes excessively high, and particularly when the vehicle is rapidly braked on a higher road. When a proportioning valve is used, the fluid pressure of the rear wheel is lower than that of the front wheel. However, it increases in proportion to the fluid pressure of the front wheel, and reaches the limit lock pressure. The above described problem occurs.

SUMMARY OF THE INVENTION

Accordingly, it is an object of this invention to provide an anti-skid control apparatus for a vehicle braking system which can be small-sized and light, and can avoid the fear of locking of rear wheels in any cases.

In accordance with an aspect of this invention, in an anti-skid control apparatus for a vehicle braking system including: (A) a pair of front wheels, and a pair of rear wheels, (B) wheel speed sensors associated with said wheels, respectively; (C) a first fluid pressure control valve device for controlling the brake fluid pressure of the wheel cylinder of one of said front wheels, arranged between a first fluid pressure generating chamber of a tandem master cylinder and said wheel cylinder of the one front wheel; (D) a second fluid pressure control valve device for controlling the brake fluid pressure of the wheel cylinder of another of said front wheels, arranged between a second fluid pressure generating chamber of said tandem master cylinder and said wheel cylinder of the other font wheel; (E) a control unit receiving outputs of said wheel speed sensors for measuring or judging the skid conditions of said front and rear wheels and for generating instructions for controlling said first and second fluid pressure control valve devices; and (F) a valve apparatus for generating a fluid pressure in accordance with the lower one of the brake fluid pressures of said front wheels controlled with said first and second fluid pressure control valve devices, being arranged between said wheel cylinders of front wheels and those of the rear wheels; the improvements in which said control unit discriminates the frictionally lower one (designated as "low side") of the sides of the road on which said wheels are running, on the basis of the measuring or judging results of the skid conditions of said rear wheels, combines logically the measuring or judging results of the skid conditions of said rear wheels with the measuring or judging result of the skid condition of the one front wheel running on the low side for generating the instruction for controlling said first or second fluid pressure control valve device, and generates the instruction for controlling said second or first fluid pressure control valve device, on the basis of the measuring or judging result of the skid condition of the other front wheel running on the high side (frictionally higher side) independently of those of said rear wheels.

The foregoing and other objects, features, and advantages of the present invention will be more readily understand upon consideration of the following detailed description of the preferred embodiments of the invention, taken in conjunction with the accompanying drawings.

BRIEF DESCRIPTION OF THE DRAWINGS

FIG. 6 is a circuit diagram of a logic part in FIG. 2;

FIG. 7 is a circuit diagram of a motor drive circuit in FIG. 2; and

FIG. 9 is a circuit diagram of an important part of a first modification of the logic circuit of FIG. 6;

DESCRIPTION OF THE PREFERRED EMBODIMENT

Figure 1:
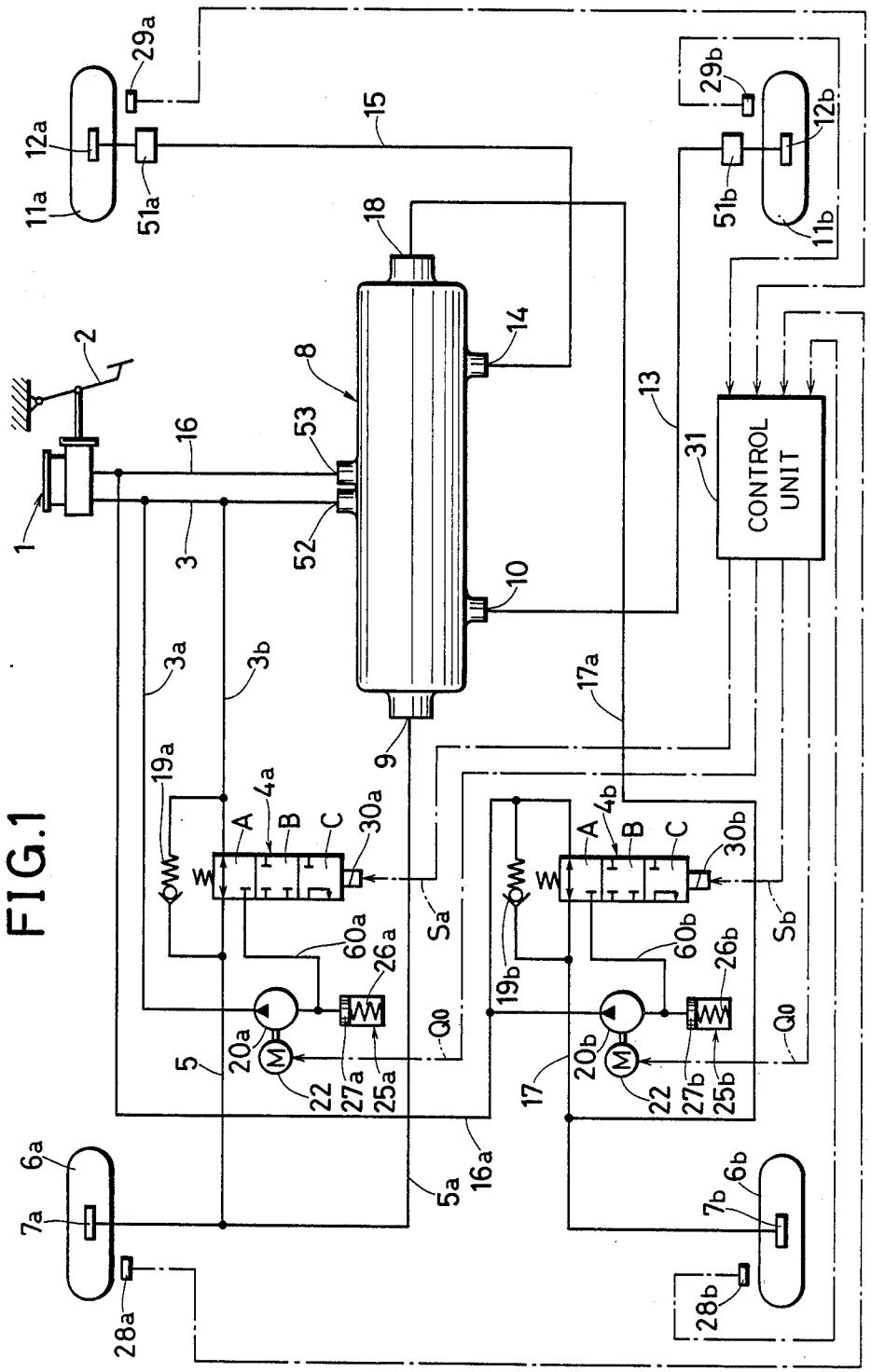
FIG. 1 is a schematic view of a anti-skid control apparatus according to an embodiment of this invention.

In FIG. 1, a brake pedal 2 is connected to a tandem master cylinder 1. One fluid pressure chamber of the tandem master cylinder 1 is connected to a wheel cylinder 7a of a right front wheel 6a through a conduit 3, a conduit 3b divided from the conduit 3, an electromagnetic three position valve device 4a and a conduit 5. The conduit 5 is further connected to a first input port 9 of a valve apparatus 8 to be hereinafter described in detail. The first input port 9 normally communicate with a first output port 10 in the valve apparatus 8. The first output port 10 is connected to a wheel cylinder 12b of a left rear wheel 11b through a conduit 13 and a proportioning valve 51b.

Another fluid pressure chamber of the tandem master cylinder 1 is connected to a wheel cylinder 7b of a left front wheel 6b through a conduit 16a, an electro-magnetic three position valve deice 4b and a conduit 17. The conduit 17 is further connected to a second input port 18 of the valve apparatus 8 through a conduit 17a. The second input port 18 normally communicates with a second output port 14 of the valve apparatus 8. The second output port 14 is connected to a wheel cylinder 12a of a right rear wheel 11a through a conduit 15 and a proportioning valve 51a.

Discharge openings of the valve devices 4a and 4b are connected through conduits 60a and 60b to hydraulic reservoirs 25a and 25b, respectively. The hydraulic reservoirs 25a and 25b include pistons 27a and 27b slidably fitted to casings and relatively week springs 26a and 26b. Reserving chambers of a reservoirs 25a and 25b are connected to suction openings of fluid pressure pumps 20a and 20b.

Although the fluid pressure pumps 20a and 20b are schematically shown, each of them consist of a pair of casings, pistons slidably fitted to a casings, an electro-motor 22 reciprocating the piston, and check valves. Supply openings of the fluid pressure pump 20a and 20b are connected to the conduits 3a and 16a.

In FIG. 1, two electro-motors 22 are shown, but actually the fluid pressure pumps 20a and 20b are driven by one electro-motor in common.

Wheel speed sensors 28a, 28b, 29a and 29b are associated with the wheels 6a, 6b, 11a and 11b respectively, and they generate pulse signals having frequencies proportional to the rotational speeds of the wheels 6a, 6b, 11a and 11b. The pulse signals of the wheel speed sensors are supplied to a control unit 31 according to this invention.

Figure 2:
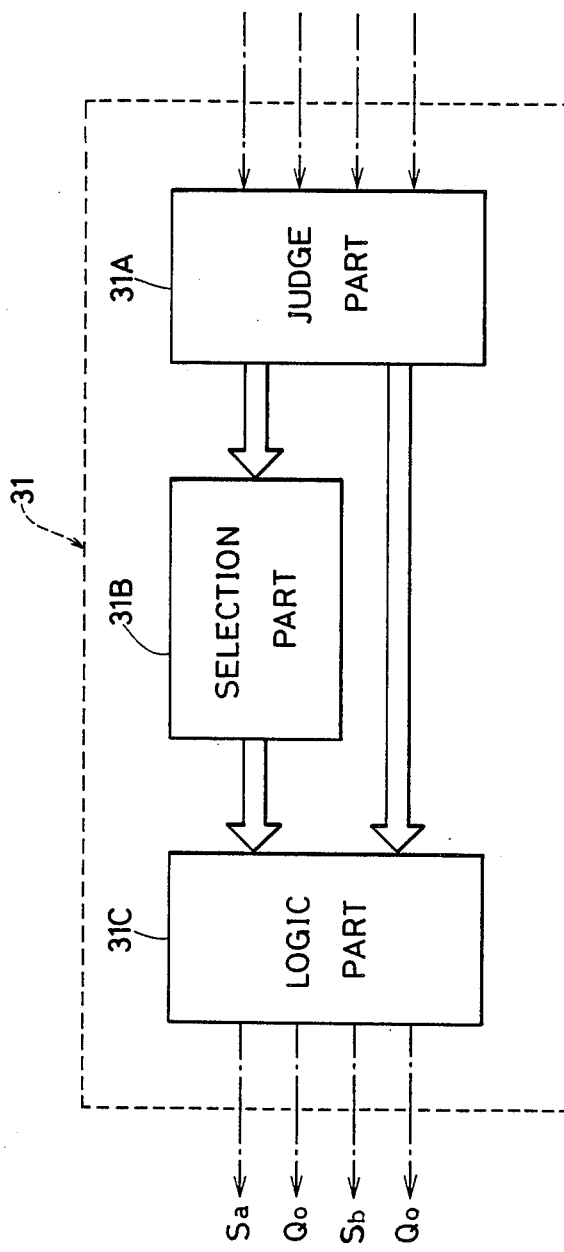
FIG. 2 is a block diagram of a control unit in FIG. 1.

Although described hereinafter in detail, the control unit 3, as shown in FIG. 2, consists of a judge part 31A, a selection part 31B and a logic part 31C. Output terminals of the wheels speed sensors 28a, 28b, 29a and 29b are connected to input terminals the judge part 31A. The judge part 31A receives the wheel speed signals, judges them and supplies the judge results to the selection part 31B and the logic part 31C. As will be hereinafter described, the outputs of the selection part 31B and the judge results are logically combined with each other in the logic part 31C. Control signals Sa and Sb, and motor drive signals Qo as the calculation or measurement results are generated from the control unit 31, and are supplied to solenoid portions 30a and 30b of the valve devices 4a and 4b and motors 22, respectively. Dash lines represent electric lead wires.

Although schematically shown, the electromagnetic valves devices 4a and 4b have well-known constructions.

The valve devices 4a and 4b take anyone of three positions A, B and C in accordance with the current intensities of the control signals Sa and Sb.

When the control signals Sa and Sb are "0" in current level, the valve devices 4a and 4b take first positions A for increasing the brake pressure to the brake for the wheel, respectively. In the first position A, the master cylinder side and the wheel cylinder side are made to communicate with each. When the control signals Sa and Sb are "$\frac{1}{2}$" in current level, the valve devices 4a and 4b take second positions B for maintaining the brake pressure to the brake at constant, respectively. In the second position B, the communications between the master cylinder side and the wheel cylinder side, and between the wheel cylinder side and the reservoir side are interrupted. When the control signals Sa and Sb are "1" in current level, the valve devices 4a and 4b take third positions C for decreasing the brake pressure to the brake, respectively. In the third position C, the communication between the master cylinder side and the wheel cylinder side is interrupted, while the communication between the wheel cylinder side and the reservoir side is made. The brake fluid is discharged through the conduit 60a and 60b into the reservoir 25a and 25b from the wheel cylinders 7a, 7b and 12a and 12b.

The control unit 31 further generates drive signal Qo for the motors 22 and 22. When anyone of the control signals Sa and Sb becomes initially "1", the drive signal Qo is generated, and it is kept during the skid control operation. The drive signal Qo is supplied to the motors 22 and 22.

Figure 3:
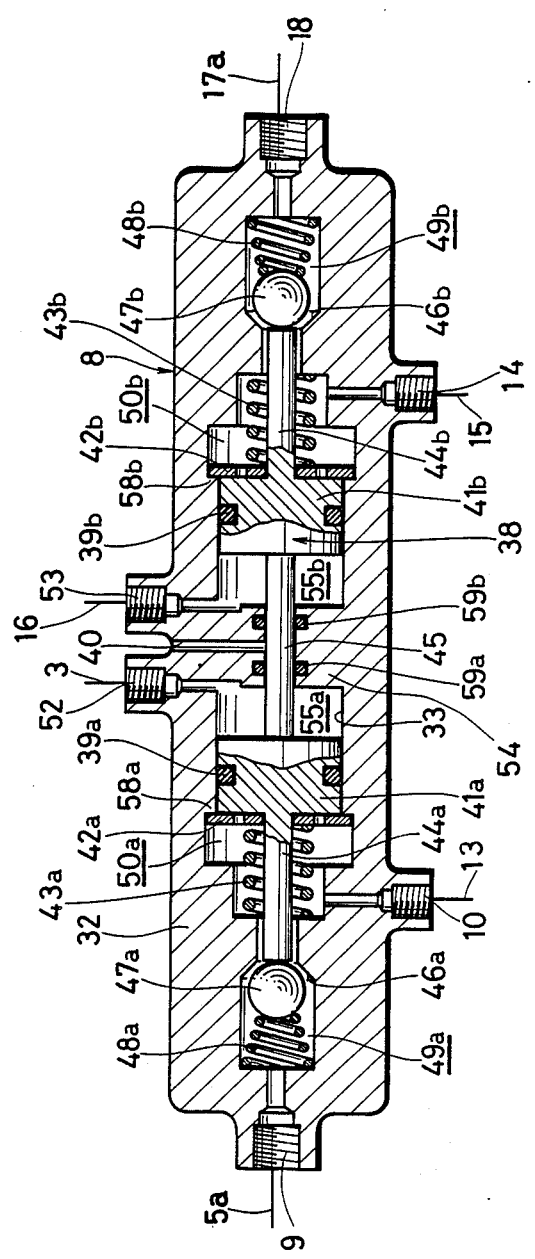
FIG. 3 is an enlarged cross-sectional view of a valve apparatus in FIG. 1.

Next, the details of the valve apparatus 8, to which the brake fluid pressures are applied from the wheel cylinders 7a and 7b of the front wheels 7a and 6b, will be described with reference to FIG. 3.

A stepped through hole 33 is axially formed in a casing 32 for the valve apparatus 8. The above-described first and second input ports 9 and 18 are formed in the left and right openings, respectively.

A stepped piston 38 provided with seal rings 39a and 39b is slidably fitted to a central position of the stepped hole 33. The stepped piston 33 is symmetrical; and it consists of a pair of large-diameter portions 41a and 41b, a pair of rod portions 44a and 44b and a small-diameter portion 45 combining integrally the larger-diameter portions 41a and 41b. The small diameter portion 45 is slidably fitted into a central hole of a partition 54 of the casing 32, sealed with seal rings 59a and 59b.

Spring receiving rings 42a and 42b are fitted to the rod portions 44a and 44b, and they receive springs 43a and 43b. The stepped piston 38 is urged to the center of the stepped hole 33 by the springs 43a and 43b, and so it is normally put at a neutral position as shown in FIG. 3. The spring receiving rings 42a and 42b normally contact with stepped portions 58a and 58b formed in the inner wall of the casing 32. The inside positions of the rings 42a and 42b are determined by them.

Normally, the rod portions 44a and 44b of the piston 38 contact with valve balls 47a and 47b which are positioned in input chambers 49a and 49b, and are urged inwards by springs 48a and 48b. In the shown condition, the valve balls 47a and 47b are separated from valve seats 46a and 46b by the rod portions 44a and 44b.

Output chambers 50a and 50b, and master cylinder pressure chambers 55a and 55b are formed at both sides of the large-diameter portions 41a and 41b of the piston 38. The output chambers 50a and 50b communicate always with the above-described output ports 10 and 14. The master cylinder pressure chambers 55a and 55b communicate always with the fluid pressure chambers of the tandem master cylinder 1 through connecting ports 52 and 53 and the conduits 3 and 16 connected to the ports 52 and 53. Small openings are formed in the spring receiving rings 42a and 42b, so that the larger-diameter portions 41a and 41b of the piston 38 can easily receive the fluid pressure at the outside surfaces.

According to this embodiment, the surfaces of the larger-diameter portions 41a and 42b of the piston 38 receiving fluid pressures from the output chambers 50a and 50b, and the master cylinder pressure chambers 55a and 55b are annular. The annular pressure-receiving surfaces are equal to each other in area. In other words, the diameters of the rod portions 44a and 44b are equal to the diameter of the smaller-diameter portions 45.

In FIG. 1, check valves 19a and 19b are connected in parallel with the electromagnetic valve devices 4a and 4b. They permit brake fluid to flow only in the direction from the wheel cylinder side towards the master cylinder side. Both sides of the valve devices 4a and 4b communicate with each other through throttling holes in the A- positions. Accordingly, pressurized fluid is rapidly returned through the check valves 19a and 19b to the master cylinder 1 from the wheel cylinders 7a, 7b, 12a and 12b, when the brake is released.

Or when the brake pedal 2 is released from treading in the B or C-positions of the valve devices 4a and 4b during the skid control, the brake fluid can be returned from the wheel cylinder side to the master cylinder side through the check valves 19a and 19b.

Next, the details of the judge part 31A in the control unit 31 will be described with reference to FIG. 4.

The judge part 31A receives the outputs of the sensors 28a, 28b, 29a, 29b to judge the skid conditions of the wheels 7a, 6b, 11a, 11b. The judge circuits for the respective wheels 6a, 6b, 11a, 11b are the same in construction. FIG. 4 shows only the judge circuit for the right front wheel 6a. It will be representatively described hereinafter. However, it is partially in common with the judge circuit for the left rear wheel 11b of the same conduit system. Accordingly, only a part of the judge circuit for the left rear wheel 11b is shown in FIG. 4. The signals from the wheel speed sensors 28a and 29b are supplied to wheel speed signal generators 61a and 61b. Digital or analog outputs proportional to the wheel speeds are obtained from the wheel speed signal generator 61a and 61b and they are supplied to differentiators 62a, 62b, slip signal generators 72a, 72b and a slip ratio setting circuit 69. The circuit 69 is in common, in the judge circuits for the front and rear wheels 6a and 11b of the same conduit system. It consists of an approximate vehicle speed signal generator 66 and multipliers 67 and 68. The higher of the outputs of the wheel speed signal generators 61a and 61b is selected, and an approximate vehicle speed signal is formed on the basis of the higher one, in the approximate vehicle speed signal generator 66. For example, multiplier numbers 0.85 and 0.70 are set in the multiplies 67 and 68, respectively. Output terminals of the slip ratio setting circuit 69 are connected to change-over circuits 70a and 70b. In the circuits 70a and 70b, movable contacts are normally connected to the output sides of the multiplier 68. Output terminals of the change-over circuits 70a and 70b are connected to the slip signal generators 72a, 72b. The outputs of the change-over circuits 70a and 70b, therefore, the values of (the approximate vehicle speed x the output 0.85 or 0.70 of the multiplier 67 or 68) are compared with the wheel speeds as the outputs of the wheel speed signal generators 61a and 61b, in the slip signal generators 72a and 72b. When the formers are smaller than the latter, the slip signal generators 72a and 72b generate slip signals λ. Since the judge circuits are the same for the left rear wheel 11b and right front wheel 6a, hereinafter only the judge circuit for the right front wheel 6a will be described.

The differentiator 62a receives the output of the wheel speed signal generator 61a and differentiate it with respect to time. The output of the differentiator 62a is supplied to a deceleration signal generator 63a, and to first and second acceleration signal generators 64a and 65a. A predetermined threshold deceleration (for example, $-1.4$ g) is set in the deceleration signal generator 63a, and it is compared with the output of the differentiator 72a. Predetermined threshold accelerations (for example, 0.5 g and 7 g) are set in the first and second acceleration signal generators 64a and 65a respectively and they are compared with the output of the differentiator 62a. When the deceleration of the wheel becomes larger than the predetermined threshold deceleration ($-1.4$ g), a deceleration signal $-b$ is generated from the deceleration signal generator 63a. When the acceleration of the wheel becomes larger than the predetermined threshold acceleration (0.5 g or (7 g), an acceleration signal $+b_1$ or $+b_2$ is generated from the acceleration signal generator 64a or 65a.

An output terminal of the first acceleration signal generator 64a is connected to negation input terminals (indicated by circle O) of AND gates 73a, 78a, and a first input terminal of an OR gate 82a. An output terminal of the AND gate 78a is connected to an input terminal of a pulse generator 80a and an input terminal of an AND gate 81a. An output terminal of the pulse generator 80a is connected to a negation input terminal of the AND gate 81a. A stepwise brake-increasing signal generator (U) is constituted by the acceleration signal generator 64a, the pulse generator 80a, the OR gate 82a, and the AND gate 81a, and it generates pulse signals to slowly increase the brake pressure. The width of the first pulse is so designed as to be larger than that of the sequent pulses in the pulse generator 80a. Thus, the insufficiency of the braking force is prevented.

The output terminal of the deceleration signal generator 63a is connected to a second input terminal of the OR gate 82a. The output terminal of the AND gate 81a is connected to the third input terminal of the OR gate 82a. The output terminal of the slip signal generator 72a is connected to the other input terminal of the AND gate 73a. The output terminal of the AND gate 73a is connected to one input terminal of an OR gate 76a. An output terminal of an AND gate 75a is connected to another input terminal of the OR gate 76a. The output terminal of the deceleration signal generator 63a is connected to one input terminal of the AND gate 75a and an output terminal of an OFF delay timer 86a is connected to another input terminal of the AND gate 75a. The delay time of the OFF delay timer 86a is sufficiently long. Once the output of the OFF delay timer 86a becomes "1", it is maintained during the anti-skid control operation. An output terminal of the OR gate 76a is connected to an input terminal of the OFF delay timer 86a, and further connected to one input terminal of an OR gate 87a. The output terminal of the OFF delay timer 86a is connected to another negation input terminal of the OR gate 87a.

An output terminal of the OR gate 87a is connected to one input terminal of a counter 88a, and the output terminal of the AND gate 81a of the stepwise brake-increasing signal generator U is connected to another input terminal of the counter 88a. Pulses from the AND gate 81a are counted by the counter 88a. When the counted number reaches a predetermined number, the output of the counter 88a becomes "1". And when the output of the OR gate 87a becomes "1", the content of the counter 88a is reset.

The output terminals of the deceleration signal generator 63a, first acceleration signal generator 64a, and pulse signal generator 80a are further connected to the respecture input terminals of an OR gate 71a. The change-over circuit 70a is changed over by the output of the OR gate 71a. When the output of the OR gate 71a becomes "1", the movable contact of the change-over circuit 76a is changed over to the output side of the multiplier 67.

The output terminal of the OR gate 82a is connected to one input terminal of an AND gate 83a, and the output terminal of the second acceleration signal generator 65a is connected to another negation input terminal. The output terminal of the AND gate 83a is connected to one input terminals of an AND gate 84a and OR gate 85a. The output terminal of the OR gate 76a is connected to another negation input terminal of the AND gate 84a and to another input terminal of the OR gate 85a.

The output terminal of the AND gate 75a is connected to an OFF delay inner 77a. The output terminal thereof is connected to a fourth input terminal of the OR gate 82a, another OFF delay timer 131a and further a negation input terminal of an AND gate 130a. The output terminal of the OFF delay timer 131a is connected to another input terminal of the AND gate 130a.

The judge circuit for the right front wheel 6a is constructed as above described. Ten kinds of signals are taken out from this circuit. They will be denominated as shown in the right end of FIG. 4. The output signal of the second acceleration signal generator 65a is denominated as $+b_2VR$, that of the first accelerator signal generator 64a as $+b_1VR$, that of the AND gate 84a as EVVR, those of the OR gates 85a and 76a as EAVR and AVVR, respectively, that of the OFF delay timer 86a as AVZVR, that of the counter 88a as CEVR, that of the deceleration signal generator 63a as $-bVR$, that of the AND gate 81a as PLVR, and that of the slip signal generator 72a as AVR. The letter "V" means "front side", and the letter "R" means "right side".

The judge circuits for the left rear wheel 11b, the left front wheel 6b and the right rear wheel 11a are constructed in the similar manner, respectively. The ten kinds of signals $+b_2HL$, $+b_1HL$, EVHL, EAHL, AVZHL, AVHL, CEHL, PLHL, $-bHL$ and λHL are taken out from the judge circuit for the left rear wheel 11b, where the letter "H" means "rear side" and the letter "L" means "left side". Simularly $+b_2VL$, $+b_1VL$, EVVL, EAVL, AVZVL, AVVL, CEVL, PLVL, $-bVU$ and λVL, and $+b_2HR$, $+b_1HR$, EVHR, EAHR, AVZHR, AVHR, CEHR, PLHR, −bHR and λHR are taken out from the judge circuits for the left front wheel 6b and the right rear wheel 11a, respectively.

Next, the details of the selection part 31B of the control unit 31 will be described with reference to FIG. 5.

The selection part 31B is constructed symmetrically with respect to the rear wheels 11a and 11b. The output signals EVHR, EVHL, $\overline{\text{AVZHR}}$, $\overline{\text{AVZHL}}$ (negations of the AVZHR, AVZHL, respectively), CEHR, CEHL, AVHR, AVHL, EAHR and EAHL from the judge part 31A are supplied to the selection part 31B. The output signals EVHR and EVHL are supplied to one input terminals of AND gates 90a and 90b, respectively and input terminals of an OR gate 93. The output signals $\overline{\text{AVZHR}}$ and $\overline{\text{AVZHL}}$ are supplied to one input terminals of OR gate 91a and 91b, respectively. The output signals CEHR and CEHL are supplied to other input terminals of the OR gates 91a and 91b. Output terminals of the OR gates 91a and 91b are connected to reset terminals $R_1$ and $R_2$ of flip-flops 89a and 89b, respectively.

The flip-flops 89a and 89b are of the D-type. The output signals AVHR and AVHL are supplied to set terminals $S_1$, $S_2$ of the flip flops 89a and 89b, and they are further supplied to an OR gate 96.

The output signals EAHR and EAHL are negated, and then supplied to clock terminals $C_1$, $C_2$ of the flip-flops 89a, 89b. Output terminals $Q_1$, $Q_2$ of the flip-flops 89a, 89b are connected to other input terminals of the AND gate 90a, 90b. Negation output terminals $\overline{Q}HD\ 1$, $\overline{Q}_2$ are connected to data terminals $D_2$ and $D_1$ of other flip-flops 89b and 89a, and further they are connected to input terminals of an AND gate 92. An output terminal of the OR gate 93 is connected to the remaining one input terminal of the AND gate 92. Output terminals of the AND gates 90a, 90b, 92 are connected to input terminals of an OR gate 94, respectively. An output terminal of the OR gate 94 is connected to one input terminal of an AND gate 95. An output terminal of the OR gate 96 is connected to another negation input terminal of the AND gate 95. Output terminals of the AND gate 95 and OR gate 96 are connected to input terminals of an OR gate 97, respectively.

The output signals EVHR and EVHL are further supplied to one negation input terminals of AND gates 98a and 98b, and to other input terminals of the other AND gates 98b and 98a. Output terminals of the AND gates 98a and 98b are connected to a set terminals of a flip flop 100, and a reset terminal R thereof. A signal SLA is obtained from an output terminal Q of the flip-flop 100, and it is supplied to the subsequent logic part 31C. An output f of the AND gate 95 is denominated as EVH, that g of the OR gate 97 as EAH, and that e of the OR gate 96 as AVH. They are supplied to the subsequent logic part 31C. Thus, first select-low control signals EVH, EAH and AVH are formed from the judge results of the skid conditions of both of the rear wheels 11a and 11b.

Next, the logic part 31c of the control unit 31 will be described in detail with reference to FIG. 6.

The logic part 31C is constructed in nearly symmetrical manner with respect to the right and left wheels.

The input signals CEVL, CEVR, AVZVL, AVZVR, EVVL, EVVR, AVVL, AVVR, EAVL, EAVR, CEHL, CEHR, AVHL, AVHR, PLHL, PLHR, PLVL, PLVR are supplied from the judge part 31A. And the input signals EVH, AVH, EAH and SLA are supplied from the selection part 31B.

The signals CEVL and CEVR are supplied to one input terminals of OR gates 105a and 105b. The signals AVZVL and AVZVR are supplied to another negation input terminals of the OR gate 105a and 105b. Output terminals of the OR gates 105a and 105b are connected to reset terminals of flip-flops 101a and 101b. The signals EVVL and EVVR are supplied to one input terminals of AND gates 103a, 103b and OR gates 107a and 107b.

The signals AVVL and AVVR are supplied to set terminals S of the flip-flops 101a and 101b, and one input terminals of OR gates 111a and 111b. The signals EAVL and EAVR are negated and then supplied to clock terminals C of the flip-flops 101a and 101b. Output terminals Q of the flip-flops 101a and 101b are connected to other input terminals of the AND gates 103a and 103b. $\overline{Q}$ terminals of the flip-flops 101a and 101b are connected to first input terminals of AND gates 108a and 108b, and further to data terminals D of other flip-flops 102a and 102b. Similarly, $\overline{Q}$ terminals of the flip-flops 102a and 102b are connected to data terminals D of the other flip-flops 101a and 101b, and they are connected to third input terminals of the AND gates 108a and 108b. Output terminals of the OR gates 107a and 107b are connected to second input terminals of the AND gates 108a and 108b.

The signals AVHL and AVHR are supplied to set terminals S of the flip-flops 102a and 102b. Q output terminals of the flip-flops 102a and 102b are connected to one input terminals of AND gates 104a, 104b and 112a and 112b. Further, they are connected to third input terminals of the OR gates 106b and 106a. Output terminals of the AND gates 104a and 104b are connected to third input terminals of OR gates 109a and 109b. Output terminals of the AND gates 103a, 103b and 108a, 108b are connected to first and second input terminals thereof, respectively.

Output terminals of the AND gates 112a and 112b are connected to other input terminals of the OR gate 111a and 111b. Output terminals of the OR gates 109a, 109b and 111a, 111b are connected to one input terminals of AND gates 110a and 110b, and to other negation input terminals thereof.

The signals AVHL and AVHR are further connected to third input terminals of AND gates 113b and 113a. The signals PLHL, PLVL and PLHR, PLVR are supplied to first and second input terminals of the AND gates 113a and 113b, respectively. Output terminals of the AND gates 113a and 113b are connected to second input terminals of the OR gates 106a and 106b. The signals CEHL and CEHR are supplied to first input terminals of the OR gates 106a and 106b.

The signal EVH is supplied to one input terminals of AND gates 114a and 114b, and further to the other input terminals of the AND gates 104a and 104b. Output terminals of the AND gates 114a and 114b are connected to the other input terminals of the OR gates 107a and 107b. The signal SLA, as it is, is supplied to another input terminal of the one AND gate 114a, while the signal SLA is negated, and then supplied to another input terminal of the other AND gate 114b. The signal AVH is supplied to other input terminals of the AND gates 112a and 112b. And the signal EAH is negated and then supplied to clock terminals C of the flip-flops 102a and 102b.

In the above-described manner the first select-low control signals are logically combined with the judge results of the front wheel running on the frictionally low side of the road, to form second select-low control signals.

Output signals EV' and EV of the AND gates 110a and 110b at the last stage of the logic part 31C correspond to the control signals Sb, Sa of the current level "½", and they are supplied to the solenoid portion 30b and 30a of the change-over valves 4b and 4a in FIG. 1, respectively. Output signals AV' and AV of the OR gates 111a and 111b at last stage of the logic part 31C correspond to the control signals Sb, Sa of the current level "1", and they are supplied to the solenoid portions 30b and 30a of the change-over valves 4b and 4a in FIG. 1, respectively.

Although not shown in FIG. 6, the logic part 31C includes a motor drive circuit shown in FIG. 7. It consists of an OR gate 145 and an amplifier 146 connected to an output terminal of the OR gate 145. The signals AVZVR, AVZHL, AVZVL and AVZHR are supplied to input terminals of the OR gate 145. An output Qo of the amplifier 146 is supplied to the motor 22 in FIG. 1.

Next, there will be described operations of the above described anti-skid apparatus.

It is now assumed that both of the conduit systems are in order, and the wheels 6a, 6b, 11a and 11b run on the road which is uniform in frictional coefficient.

The vehicle driver treads the brake pedal 2. At the beginning of the braking, the control signals Sa and Sb are "0" from the control unit 31. Accordingly, the valve devices 4a and 4b are in the A-position. Pressurized fluid is supplied from the master cylinder 1 to the wheel cylinders 7a and 7b of the front wheels 6a and 6b through the conduits 3, 16, the valves devices 4a, 4b and the conduits 5, 17. Further, it is supplied to the wheel cylinders 12a and 12b of the rear wheels 11a and 11b through the first and second input ports 9, 18, the input chambers 49a, 49b, the output chambers 50a, 50b, the first and second output ports 10, 14 in the valve apparatus 8, the conduits 13 and 15 and the proportioning valves 51a and 51b. Thus, the wheels 6a, 6b, 11a and 11b are braked.

The fluid pressures of the fluid pressure generating chambers of the master cylinder 1 rise substantially at the same rate. Accordingly, the pressures of the master cylinder pressure chambers 55a and 55b are substantially equal to each other in the valve apparatus 8. Further, the pressures of the output chambers 50a and 50b, and therefore the input chambers 49a and 49b, when the valve balls 47a and 47b are separated from the valve seats 47a and 46b, are substantially equal to each other. Accordingly, the piston 38 is not moved, and remains positioned at the shown neutral position.

When the deceleration or slip ratio of the wheels 6a, 6b, 11a and 11b becomes higher than the predetermined deceleration or slip ratio with the increase of the brake fluid pressure, the control signals Sa and Sb become high level "1" or middle level "½". The solenoid portions 30a and 30b are energized.

Although operations of the control unit 31 according to this invention will be described hereinafter, first operations of the valve apparatus will be described at the control signals Sa, Sb ="1" and "½".

When the control signals Sa, Sb become "1", the valves 4a and 4b take the third position C. The conduits 3 and 16 are interrupted from the conduits 5 and 17, respectively. However, the conduits 5 and 17 are made to communicate with the conduits 60a and 60b. The pressurized fluid is discharged from the wheel cylinders 7a and 7b of the front wheels 6a and 6b into the hydraulic reservoirs 25a and 25b through the conduits 5, 17, 60a and 60b. The pressurized fluid from the wheel cylinders 12a and 12b of the rear wheels 11a and 11b is discharged through the conduits 15, 13, the output ports 14, 10, the output chambers 50a, 50b, the input chambers 49a, 49b, the input ports 18, 9 in the valve apparatus 8, and the conduits 17a, 5a, 60a and 60b, into the hydraulic reservoirs 25a and 25b. Thus, the brakes of the wheels 6a, 6b, 11a and 11b are relieved.

The brake fluid is sucked from the reservoirs 25a and 25b and supplied towards the conduits 3a and 16a, nearly at the same rate by the fluid pressure pumps 20a and 20b. Accordingly, the fluid pressures of the output chambers 50a and 50b at both sides of the piston 38 are decreased nearly at the same rate. The piston 38 remains stopped at the neutral position, and the valve balls 47a and 47b remain separated from the valve seats 46a and 46b.

When the control signals Sa and Sb become middle level "½", the valves 4a and 4b take the second position B. The conduits 3b, 16a are interrupted from the conduits 5, 17. Further, the conduits 5, 17 are interrupted from the conduits 60a, 60b. Thus the brake fluid pressure of the wheel cylinders 7a, 6b, 12a and 12b are maintained at constant. The fluid pressure pumps 20a and 20b continue to supply brake fluid towards the conduits 3 and 16.

When the skid conditions of the wheels 6a, 6b, 11a and 11b are removed, the control signals Sa and Sb become again low level "0". The valves 4a and 4b take the position A. The master cylinder side is made to communicate with the wheel cylinder side. The braking forces to the wheels 7a, 6b, 11a and 11b again increases.

Hereafter, the above-described operations are repeated. When the running speed of the vehicle reaches the desired speed, or when the vehicle stops, the brake pedal 2 is released from treading. The brake fluid is returned from the wheel cylinders 7a, 7b, 12a, 12b to the master cylinder 1 through the conduits, the valve apparatus 8, the valves 4a, 4b, the check valves 19a and 19b.

In the above description, the control signals Sa and Sb become "0", "1" or "½" at the same time. However, when the frictional coefficients of the road are considerably different at the right and left sides, the control signals Sa and Sb do not become "0", "1", or "½" at the same time. For example, when the frictional coefficient of the right side of the road is relatively small, the control signal Sa first becomes "1". Next, such a case will be described.

The operations at the beginning of the braking are the same as above described. When the control signal Sa becomes "1", the valve 4a takes the position C. Pressurized fluid is discharged into the reservoir 25a from the wheel cylinders 7a and 12b.

In the valve apparatus 8, the fluid pressure is decreased in the input and output chambers 49a and 50a at the left side of the piston 38. On the other hand, the brake fluid continues to be supplied to the wheel cylinders 7b and 12a from the master cylinder 1. Accordingly, the leftward pushing force to the piston 38 becomes larger. The piston 38 is moved leftwards. Thus, the right valve ball 47b comes to seat the valve 46b by spring action of the spring 48b. On the other hand, the left valve ball 47a is further separated from the valve 46b by the rod portion 44b. The left input chamber 49a remains communicating with the left output chamber 50a, while the right input chamber 49b is interrupted from the right output chamber 50b. Thus, the fluid supply to the wheel cylinder 12a of the one rear wheel 11a is interrupted from the master cylinder 1.

When the piston 38 is further moved leftwards with the decrease of the fluid pressure of the left input and output chambers 49a and 50a, the volume of the right output chamber 50b interrupted from the right input chamber 49b is increased. In other words, the fluid pressure of the wheel cylinder 12a of the rear wheel 11a is lowered since the wheel cylinder 12a communicates with the right output chamber 50b through the output port 14 and the conduit 15.

When the control signal Sa becomes again "0" to increase the fluid pressure of the input and output chambers 49a and 50a, the piston 38 is moved rightwards to decrease the volume of the right output chamber 50b, while the right valve ball 47b seats the valve seat 46b. Thus, the brake fluid pressure of the wheel cylinder 12a of the rear wheel 11a is again increased. The above-described operation means that the brake fluid pressure of the wheel cylinder 12a of the rear wheel 11a at the same side as the front wheel 6a is controlled in accordance with the brake fluid pressure of the wheel cylinders 7a of the front wheel 6a. Thus, the rear wheel 11a running on the lower frictional coefficient side of the road is prevented from locking, similarly to the front wheel 6a at the same side. If the brake fluid pressure of the wheel cylinder 12a of the rear wheel 11a is controlled in common with the brake fluid pressure of the wheel cylinder 7b of the frong wheel 6b running on the higher frictional coefficient side, the rear wheel 11a would be locked.

When the control signal Sa becomes "½", the fluid pressures of the wheel cylinders 7a and 12b of the front and rear wheels 6a and 11b are maintained at constant. And when the other control signal Sb is still "0", the fluid pressures of the wheel cylinder 7b of the other front wheel 6b continues to rise. Accordingly, the pressure of the input chamber 49b becomes higher than that of the other input chamber 49a in the valve apparatus 8. And so the piston 38 moves leftwards, and the valve ball 47b comes to contact with the valve seat 46b. Hereafter, the pressure of the output chamber 50b does not rise, and is maintained at constant. Accordingly, although the fluid pressure of the wheel cylinder 12a of the right rear wheel 11a initially becomes a little higher than that of the left rear wheel 11b, it is maintained at constant a little later.

Next, there will be described the case that one of the two conduit systems fails.

For example, when brake fluid leaks from the one conduit system including the conduit 3, the fluid pressures of the wheel cylinders 7a and 12b do not increase by treading the brake pedal 2. On the other hand, the fluid pressure of the other conduit system including the conduit 16 increase by treading the brake pedal 2. Accordingly in the valve apparatus 8, the fluid pressure of the one master cylinder pressure chamber 55b rises, while that of the other master cylinder pressure chamber 55a remains zero. Thus, the fluid pressures to both sides of the one larger-diameter portion 41a of the position 38 are zero. Those to both sides of the other larger-diameter portion 41b of the piston 38 are not zero, and substantially equal to each other. As the result, the piston 38 is not moved, and remains located at the shown neutral position. Accordingly, the valve ball 47b remains separated from the valve seat 46b.

Thus, in the right conduit system, the pressurized fluid is supplied from the master cylinder 1 into the wheel cylinder 7b of the left front wheel 6b through the conduits 16, 16a, the valve 4b and the conduit 17. Further, it is supplied from the master cylinder 2 into the wheel cylinder 12a of the right rear wheel 11a through the conduit 17a, the input chamber 49b of the valve apparatus 8 the output chamber 50b thereof (the valve ball 47b opened), and the conduit 15. Thus, the braking force can be securely obtained in the one conduit system.

When the valve 4b is changed over into the position B or C with the tendency of the locking of the front or rear wheel 6b or 11a, the fluid pressure of the input and output chambers 49b and 50b becomes lower than that of the master cylinder pressure chamber 55b, in the valve apparatus 8, and so the piston 38 is moved rightwards with the fluid pressure difference between both sides of the larger diameter portion 41b. Accordingly, the valve ball 47b is moved further rightwards and separated far from the valve seat 46b. The valve ball 47b remains separated.

When the valve 4b is changed over into the position B, the wheel cylinders 7b and 12a of the wheels 6b and 11a are interrupted both from the master cylinder and from the reservoir 25b, so that the fluid pressure of the wheel cylinders 7b and 12a increases with the rightward movement of the position 38, since the volume of the input and output chambers 49b and 50b decreases therewith.

When the valve 4b is changed over into the position C, the wheel cylinders 7b and 12a of the wheels 6b and 11a are interrupted from the master cylinder side, but communicate with the reservoir side. Thus, the braking forces of the front and rear wheels 6b and 11a are decreased, so that the wheels are prevented from locking.

As above described, the braking force can be securely obtained in the one right conduit system, even when the other conduit system fails. The special sleeve and piston are not required for opening the valve ball in the one right conduit system, as in the prior art. Accordingly, the fluid amount for moving the special sleeve and piston is not needed, and the stroke of the brake pedal 2 does not become excessive.

Next, operations of the control unit 31 according to this invention will be described.

It is now assumed that the frictional coefficient of the right side is smaller (low side). The brake pedal 2 is trodden. At time t1, the right rear wheel 11a reaches the predetermined deceleration, and so the signal −b is generated from the deceleration signal generator corresponding to the deceleration signal generator 63a of FIG. 4 in the judge circuit for the right rear wheel 11a. Although FIG. 4 shows the judge circuit for the right front wheel 11a, the same reference symbols will be hereinafter used for the corresponding elements or circuit blocks for the convenience of the description.

The signal −b is supplied to the OR gate 71a, and the movable contact of the change-over circuit 70a is changed over to the output side of the multiplier 67, by the output of the OR gate 71a. The signal −b is further supplied to the third input terminal of the OR gate 82a. The output of the OR gate 82a generates the output signal EV HR through the AND gates 83a and 84a, and further the output signal EAHR through the OR gate 85a.

Figure 8:
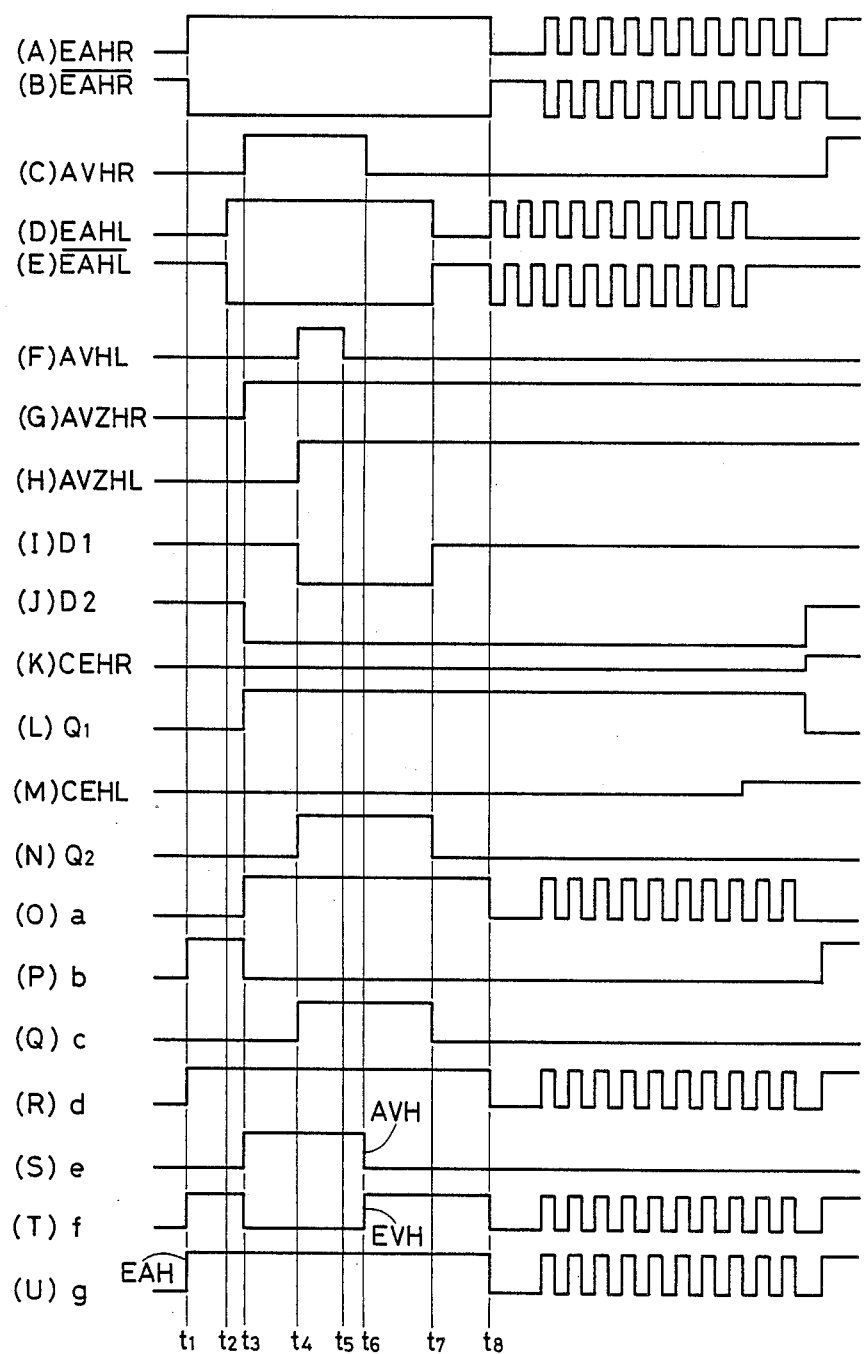
FIG. 8 is graphs for explaining operations of the embodiment of this invention.

As shown in FIG. 8(A), the signal EAHR becomes "1" at time t1. In FIG. 5, the $\overline{Q}_1$, $\overline{Q}_2$ outputs of the flip-flops 89a, 89b are "1", and the signal EVHR is now supplied to the AND gate 92. Accordingly, the output b of the AND gate 92 becomes "1", and so both of the outputs d and f of the OR gate 94 and AND gate 95 become "1". Thus, the signal EVH becomes "1". Thus, at time t1, the outputs b, d and f becomes "1", as shown in FIG. 8 P.R.T. Accordingly, the output g of the OR gate 97 becomes "1". Thus, the signal EAH becomes "1", in FIG. 5.

Figure 5:
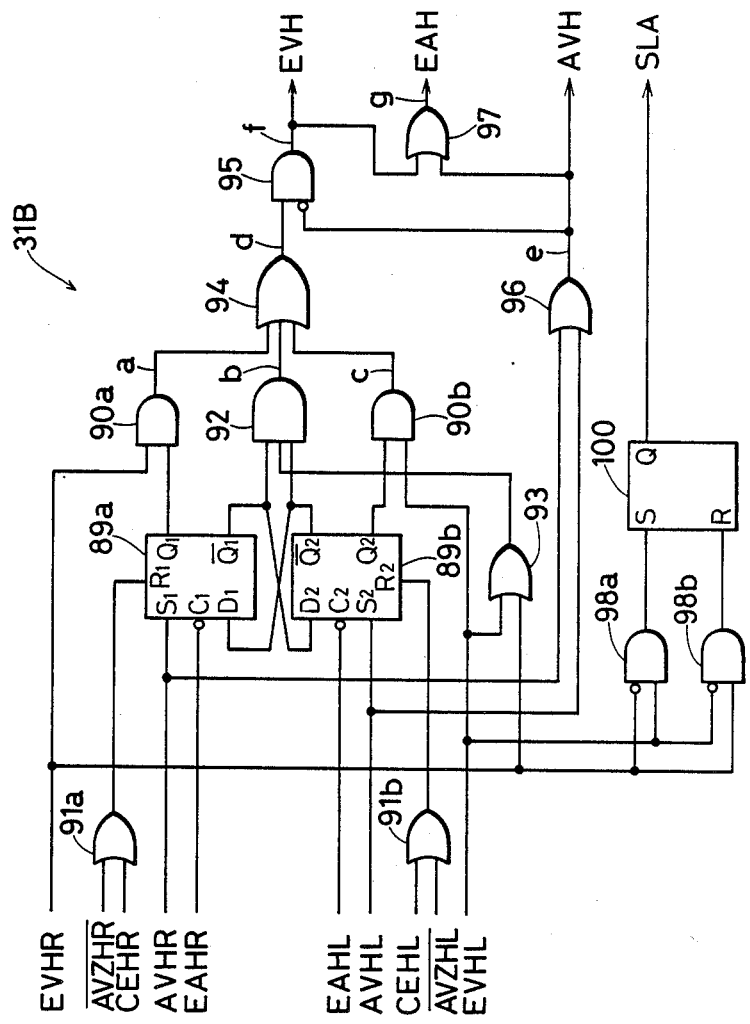
FIG. 5 is a circuit diagram of a selection part in FIG. 2.

Further, in FIG. 5, the signal EVHR is supplied to the AND gates 98a and 98b. Since the signal EVHL is still "0", the output of the AND gate 98b becomes "1", while that of the other AND gate 98a remains "0". Accordingly, the singal SLA remains "0". The right side of the road is judged to be "low side", by that fact.

In FIG. 6, the signal EVH is supplied to the one input terminal of the AND gate 104a. However, since the Q output of the flip-flop 102a to the other input terminal of the AND gate 104a is still "0", the output of the AND gate 104a is "0". The signal EVH is supplied to the input terminal of the AND gate 104b, too. However, since the Q output of the flip-flop 102b is similarly "0", also the output of the AND gate 104b is "0".

The signal EAH is supplied to the negation clock terminals C of the flip-flops 102a, 102b. However, since it is negated, the Q outputs of the flip-flops 102a, 102b remain "0".

The signal SLA is supplied to the AND gates 114a, 114b, and it is now "0". The negated signal SLA is supplied to the one AND gate 114b. Accordingly, the output of the AND gate 114b becomes "1", and therefore, the output of the OR gate 107b becomes "1". The input to the second input terminal of the AND gate 108b becomes "1". Since the $\overline{Q}$ outputs of the flip-flops 101b, 102b are "1", the output of the AND gate 108b becomes "1". The output of the OR gate 109b, therefore that of the AND gate 110b becomes "1". Thus, the output signal EV becomes "1". Accordingly, the control signal Sa of the current level "$\frac{1}{2}$" is supplied to the solenoid portion 30a of the change-over valve 4a. Thus, the braking forces to the right free 7a and rear wheels 11a, 11b are maintained at constant.

At time t2, the rear wheel 11b on the "high side" of the road reaches the predetermined deceleration. The signal EVHL, therefore, EAHL is generated, as shown in FIG. 8 (D). It is supplied to the other input terminal of the OR gate 93. The signal EVHR is already supplied to the other input terminal of the OR gate 93. Since it is maintained, the output of the OR gate 93, therefore, that b of the AND gate 92, that d of the OR gate, and the output signals EVH, EAH are unchanged as "1", as shown in FIG. 8 (D)(R)(T)(U). The output of the AND gate 98b becomes "0". However, the output of the other AND gate 98a remains "0". Accordingly, the Q output of the flip-flop 100 remains "0". Thus, the right side of the road is judged surely to be still "low side".

At time t3, the right rear wheel 11a generates the signal AVHR as shown in FIG. 8(C). It reaches the predetermined slip. The slip signal λ is generated from the slip signal generator 72a of the judge circuit for the right rear wheel 11a. It is supplied to the one input terminal of the AND gate 73a. Since the first acceleration signal $+b_1$ are not generated, the output of the AND gate 73a becomes "1". Thus, the signal AVHR is generated. At the same time, the output of the AND gate 84a or signal EVHR becomes "0". However, the output of the OR gate 95a or the signal EAHR continues to be "1", as shown in FIG. 8(A). In FIG. 5, the signal SLA remains "0".

Figure 4:
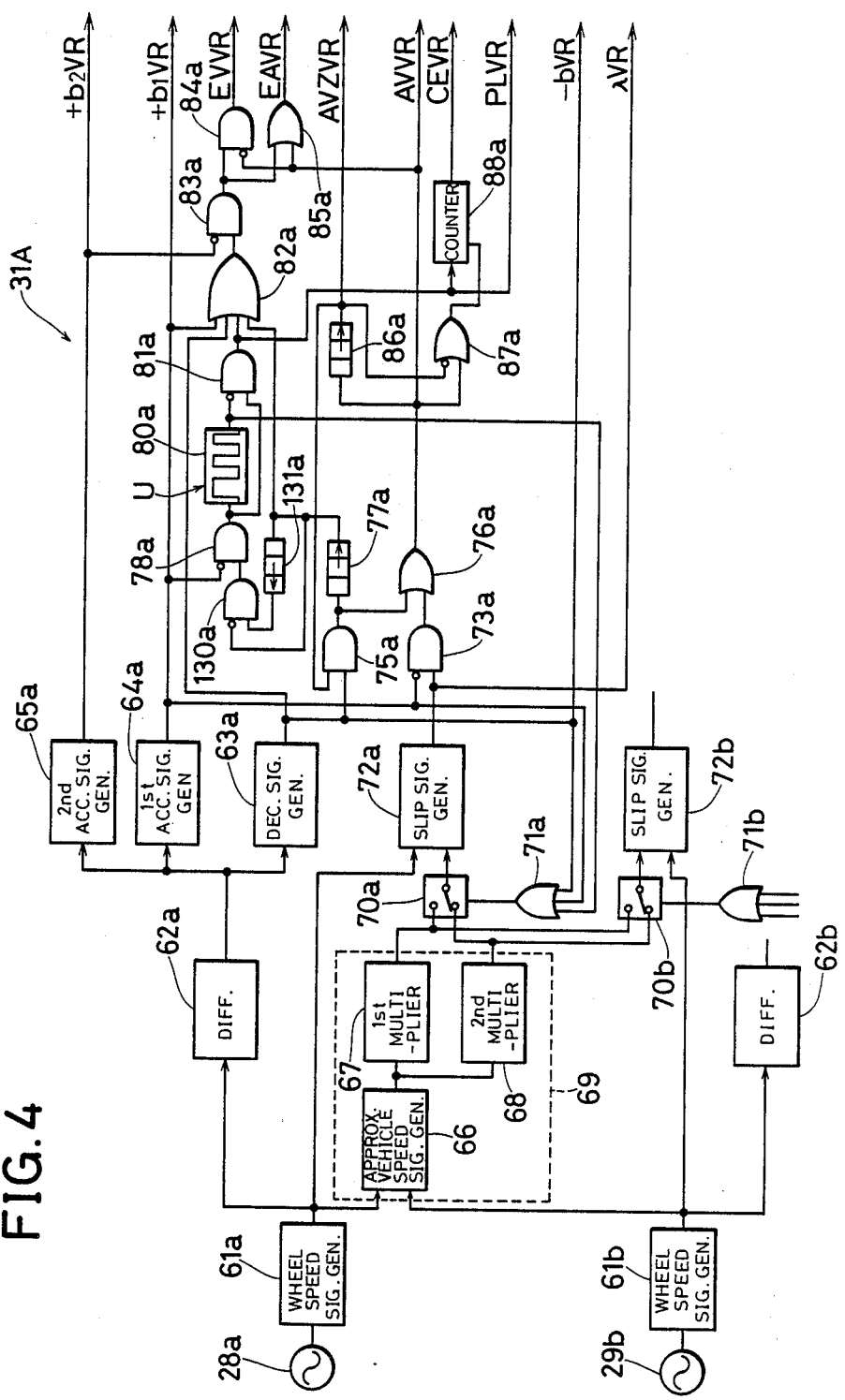
FIG. 4 is a circuit diagram of a judge part in FIG. 2.

In FIG. 4, the slip signal is supplied to the OFF delay timer 86a. The output of the OFF delay timer 86a is supplied to the one input terminal of the AND gate 75a. Accordingly, hereinafter when the deceleration signal −b is generated, the output of the AND gate 75a, therefore that of the OR gate 76a becomes "1". Thus the signal AVHR is generated. Further also after the signal −b disappears, the output of the OFF delay timer 77a connected to the output terminal of the AND gate 75a is maintained at the level "1" for the delay time of the OFF delay timer 77a.

The output of the OR gate 76a is supplied to the OFF delay timer 86a. Accordingly, the signal AVZHR is generated as shown in FIG. 8. In FIG. 7, the motor drive signal Qo is generated from the amplifier 146. The motor 22 starts to be driven in FIG. 1.

In FIG. 5, the signal AVHR is supplied to the set terminal $S_1$ of the flip-flop 89a. The Q1 output thereof becomes "1". The $\overline{Q}_1$ output thereof becomes "0". Accordingly, the input to the data terminal D2 of the other flip-flop 89b, as shown in FIG. 8J. The output of the OR gate 96, therefore the signal AVH is generated as shown in FIG. 8.S. The signal EVH becomes "0". However, the signal EAH continues to be "1", as shown in FIG. 5U.

In FIG. 6, the signal AVHR is supplied to the set terminals of the flip-flop 102b. The Q output thereof becomes "1", and it is supplied to the one input terminals of the AND gates 104b, and 112b. The input signal EVH to the other input terminal of the AND gate 104b is "0", while the input signal AVH to the other input terminal of the AND gate 112b are "1". Accordingly, the output of the AND gate 104b remains "0", while that of the AND gate 112b becomes "1". The output signal AV is obtained. Thus, the control signal Sa of the current level "1" is supplied to the solenoid portion 30a of the change-over valve 4a in FIG. 1. Thus, as described in the operations of the valve apparatus 8, the brakes of the right front wheel 6a and rear wheels 11a, 11b are relieved. The Q output of the one flip-flop 102b is "1", while that of the other flip-flop 102a is "0". Now the right side of the road is judged to be "low side" by that fact.

At time t4, the other rear wheel 11b reaches the predetermined slip during the continuation of the signal AVHR as shown in FIG. 8C. Thus, the signal AVHL is generated as shown in FIG. 8F. In FIG. 5, it is supplied to the set terminal S2 of the flip-flop 89b. Accordingly, the Q2 output thereof becomes "1" and the $\overline{Q}_2$ output thereof becomes "0". Thus, the input to the data terminal D1 of the flip-flop 89a becomes "0" as shown in FIG. 8.

The signal AVHL is supplied to the one input terminal of the OR gate 96, too. Since the signal AVHR continues to be supplied to the other input terminal of the OR gate 96, the signal AVH remains "1". In FIG. 6, the signal AVHL is supplied to the set terminal S of the flip-flop 102a. However, since the Q output of the flip-flop 102b is supplied through the OR gate 106a to the reset terminal R of the flip-flop 102a, the Q output of the flip-flop 102a remains "0" due to the reset priority. Thus, the output of the AND gate 112a remains "0". The output signal AV for the left side is not generated. The brake of the left front wheel 6b is not relieved. However, when the left front wheel 6b generates the signal AVHL, it is independently controlled for brake relief, since the signal AVVL is supplied to the OR gate 111a. Thus, the braking distance can be much shortened with the arrangement of this embodiment of the invention.

The signal AVZHL becomes "1" with the signal AVHL, as shown in FIG. 8. However, since the AVZHR has become "1", the output of the OR gate 145 has become "1". The output Qo is not influenced, and remains "1". The motor 22 continues to be driven. At time t5, the signal AVHL becomes "0". However, it has no influence on the other signals.

AT time t6, the slip signal λ of the right rear wheel 11a disappears. Accordingly, the signal AVHR becomes "0" as shown in FIG. 8C. In FIG. 4, the input to the one input terminal of the OR gate 85a becomes "0". However, after the signal —b disappears, the output of the OR gate 82a is still "1" because of the delay time of the OFF delay timer 77. Accordingly, the output of the AND gate 84a, therefore the signal EVHR becomes again "1" with the disappearance of the signal AVHR. The output to the OR gate 85a, therefore the signal EAHR continues to be "1" as shown in FIG. 8A.

In FIG. 5, the signal AVHR becomes "0". However, since the output of the OR gate 91a is still "0", the flip-flop 89a is not reset, but the Q output thereof remains "1" as shown in FIG. 8L. The signal EVHR is still "1". Accordingly, the output a of the AND gate 90a remains "1", as shown FIG. 8O. The output e of the OR gate 96 becomes "0". Accordingly, the output f of the AND gate 95, therefore the signal EVH becomes again "1" from "0" as shown in FIG. 8T. The output signal EAH of the OR gate 97 remains "1".

In FIG. 6, the input to the set terminals of the flip-flop 102b becomes "0". However, since the input to the reset terminal R thereof is "0", the Q output thereof remains "1". Since the signal EVH becomes again "1", the output of the AND gate 104b, therefore that of the OR gate 109b becomes "1". On the other hand, the input AVH to the one input terminal of the AND gate 112b becomes "0" Accordingly, the output thereof becomes "0", and the output signal AV disappears. With the disappearance of the output signal AV, the other output signal EV becomes "1". In FIG. 1, the changeover valve 4a is changed over to the position B, and the braking forces to the right front wheel 6a and the rear wheels 11a, 11b are maintained at constant.

In FIG. 4 when the deceleration signal —b disappears, and the delay time of the OFF delay timer 77a lapses, the input to the fourth input terminal of the OR gate 82a becomes "0". However, it is assumed that the left rear wheel 11b reaches the predetermined first acceleration before the lapse of the delay time of the OFF delay timer 77a. Accordingly, the input to the first input terminal of the OR gate 82a becomes "1", and the signal EAHL continues to be "1" as shown in FIG. 8D, as long as the first acceleration signal +b1 is generated, although the output of the OFF delay timer 77a becomes "0". At time t7 when the first acceleration signal +b1 disappears, the signal EAHL becomes "0".

In FIG. 5, the input to the clock terminal C2 becomes "0". It is inverted or negated and supplied to the clock terminal C2. The input "0" is supplied to the data terminal D2, and it is read out with the negated input to the clock terminal C2. Thus, the Q2 output becomes "0" as shown in FIG. 8N. Accordingly, becomes "1". The Q1 output of the other flip-flop 89a remains "0". Accordingly, the output b of the AND gate 92 remains "0".

The output c of the AND gate 90b becomes "0" with the disappearance of the Q2 output of the flip-flop 89b, as shown in FIG. 8Q.

On the other hand, the Q1 output of the flip-flop 89a remains "1", and the right rear wheel 11b still generates the signal EVHR. Accordingly, the output a of the AND gate 90a continues to be "1", and the signal EVH remains "1" as shown in FIG. 8T.

In FIG. 4, as soon as the first acceleration signal +b, disappears, the pulse generator 80a is driven for the delay time of the OFF delay timer 131a. The signal EVHL, and EAHL are changed pulse-likely as "1", "0", "1", "0", . . . , as shown in FIG. 8D, from time t8. In FIG. 5, the one input to the OR gate 93 and the one input to the AND gate 90b are changed "pulse-likely". However, the Q2 output of the one flip-flop 89b is "0", and the Q1 output of the other flip-flop 89a is "0". Accordingly the output EAH of the OR gate 97, and the output EVH of the AND gate 95 are not changed "pulse-likely", but they continue to be "1" with the signal EVHR. Accordingly, the braking forces to the right front wheel 62a and rear wheels 6a, 7b are still maintained at constant.

When the right rear wheel 11b generates the first acceleration signal +b, after time t7, the signal EVHR and EAHR continue to be "1" although the delay time of the OFF delay timer 77a. The braking forces to the right front wheel 7a and rear wheels 11a, 11b are still maintained at constant. However, at time t8 when the first acceleration signal +b, disappears, the pulse generator 80a is driven, and the signal EAHR are changed "pulse-likely" as shown in FIG. 8A. Thus, in FIG. 5, the signals EVH and EAH are "pulse-likely" changed.

Accordingly, in FIG. 6, the output of the AND gate 104b are changed "pulse-likely".

The braking forces to the right front wheel 6a and rear wheels 11a, 11b are stepwisely increased.

When the counted pulses reach the predetermined value, the output CEHR of the counter 88a (in FIG. 4) in the judge circuit for the right rear wheel 11a becomes "1". Accordingly, in FIG. 6, the input of the third input terminal of the OR gate 106b becomes "1". The output of the OR gate 106b is supplied to the reset terminal R of the flip-flops 102b to reset the latter. The Q output thereof becomes "0". Although the pulses continue, the stepwise increase of the braking forces is stopped. When the Q output of the flip-flop 102b becomes "0", the other flip-flop 102a is released from the reset condition.

Hereafter, if the right side of the road is still "low side", the above operations are similarly repeated. When the "low side" is inverted on the road, or when the left side of the road becomes "low side", operations similar to the above described operations for the right front wheel 6a and rear wheels 11a, 11b are effected for the left front wheel 6b and rear wheels 11a, 11b.

Further the "low side" is so designed as to be changed over in the case that the rear wheel 11b running on the "high side" generates the brake relieving signal or pressure decreasing signal AVHL while both of the braking forces to the front and rear wheels 6a, 11a, are stepwisely increased. In FIG. 6, while the signals PLVR and PLHR (outputs of the pulse generators 80a) are changed as "1", "0", "1", . . . , the signal AVHL becomes "1". The output of the AND gate 113b therefore that of the OR gate 106b becomes "1", and it is supplied to the reset terminal R of the flip-flop 102b.

The Q output thereof becomes "0". Accordingly, the output of the OR gate 106a becomes "0", and the input to the reset terminal R of the flip-flop 102a becomes "0". On the other hand, the signal AVHL is supplied to the set terminals of the flip-flop 102a. The Q output thereof becomes "1". Thus, the "low side" is changed over.

According to a first modification of this embodiment, the "low side" is changed over in the case that the rear wheel 11b on the "high side" generates continuously the pressure decreasing signal AVHL for a predetermined time, while the rear wheel 11a on the "low side" is rotating in the stable region or condition of the "$\mu$-slip characteristics". In order to obtain such an operation, a circuit as shown in FIG. 9 is added to the circuit of FIG. 6.

In FIG. 6, the signals AVHL and AVHR are supplied to the set terminals S of the flip-flops 102a, 102b. Referring to FIG. 9, they are further supplied through ON delay timers 121a and 121b to one input terminals of AND gates 123a and 123b, respectively. The signals AVZHL, AVZHR are supplied to first input terminals of AND gates 122a, 122b, the signals −bHL, −bHR to second negation input terminals thereof, the signals +b$_1$HL, +b$_1$HR to third negation input terminals thereof, and the signals $\lambda$HL, $\lambda$HR to fourth negation input terminals thereof. Output terminals of the AND gates 122a, 122b are connected to one input terminals of OR gates 124a, 124b. Negations of the signals AVZHL, AVZHR or the signals $\overline{AVZHL}$, $\overline{AVZHR}$ are supplied to other input terminals of the OR gates 124a, 124b.

The definition of "the stable region of the $\mu$-slip characteristics" is described, for example, in the "these of automobile technology society" 133 page, No. 31, 1985. The "stable region" means that the wheel is rotating at smaller slip rates than the slip rate at the maximum of $\mu$-value (frictional value) in the slip rate-frictional coefficient $\mu$ characteristics. According to this modification, the case that none of slip signal, first acceleration signal +b, deceleration signal −b occur, is used as sure "stable region".

When the rear wheel on the low side already generates the signal AVZHR or the anti-skid control has been effected, and when the rear wheel 11a on the low side is rotating in the stable region, the output of the AND gate 122b is "1". Accordingly, the input to the one input terminal of the AND gate 123b of the output stage is "1". When the rear wheel 11b on the high side generates continuously the signal AVHL for a longer time than the delay time of the ON delay timer 121a, the input to the other input terminal of the AND gate 123b becomes "1", and so the output thereof becomes "1". Accordingly the flip-flops 102b in FIG. 6 is reset, while the other flip flop 102a is released from the reset condition and set with the signal AVHL. The Q output of the flip-flop 102a becomes "1". Thus, the "low side" is changed over.

According to a second modification of this emobodiment, the "low side" is changed over in the case that the rear wheel 11a on the low side is rapidly accelerated, and so generates the second acceleration signal +b$_2$HR, while the rear wheel 11b on the high side generates the pressure decreasing signal AVHL. Or the "low side" is changed over in the case that the rear wheel 11b on the high side generates continuously the pressure decreasing signal AVHL for a longer time than a predetermined time, while the pressure decreasing signal AVHR of the rear wheel 11a on the low side disappears.

Figure 10:
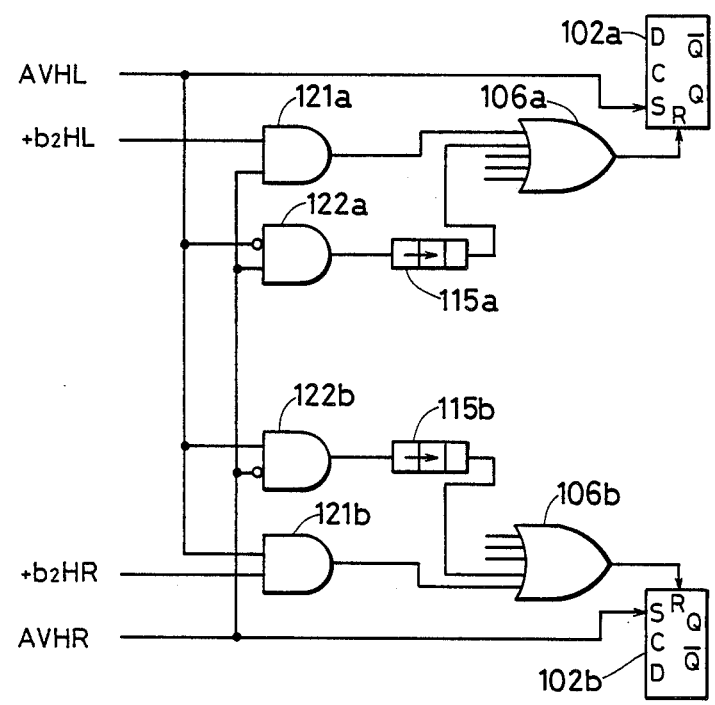
FIG. 10 is a circuit diagram of an important part of a second modification of the logic circuit of FIG. 6.

FIG. 10 shows the second modification. Other parts are the same as the circuit of FIG. 6 In FIG. 10, the signals AVHL and AVHR are supplied to one negation input terminals of AND gates 122a and 122b, respectively. Further, they are supplied to other input terminals of the other AND gates 122b and 122a, and one input terminals of AND gates 121b and 121a.

The signals +b$_2$HL and +b$_2$HR are supplied to other input terminals of the AND gates 121a and 121b. Output terminals of the AND gates 121a and 121b are connected to fifth input terminals of the OR gates 106a and 106b. Output terminals of the AND gates 122a and 122b are connected through ON delay timers 115a and 115b to fourth input terminals of the OR gates 106a and 106b.

In FIG. 10, the rear wheel 11b on the high side generates the brake relieving signal AVHL. During the generation of the signal AVHL, the rear wheel 11a is rapidly accelerated, and generates the second acceleration signal +b$_2$HR. The output of the AND gate 121b becomes "1". Accordingly, that of the OR gate 106b becomes "1" to reset the flip-flop 102b. On the other hand, the other flip-flop 102a is set with the signal AVHL. The Q output thereof becomes "1". Thus, the "low side" is changed over.

When the rear wheel 11b on the high side generates continuously the brake relieving signal AVHL for a longer time than the delay time of the ON delay timer 115b during the time that the brake relieving signal AVHR of the rear wheel 11a on the low side disappears, the output of the ON delay timer 115b becomes "1". Accordingly, the output of the OR gate 106b becomes "1", and resets the flip-flop 102b. On the other hand, the other flip-flop 102a is released from the reset condition, and it is set with the signal AVHL. Thus, the "low side" is changed over.

According to the second modification, as described with reference to FIG. 10, the low side is changed over in the case that the rear wheel 11b on the high side generates continuously the brake relieving signal AVHL for a longer time than the predetermined time during the time that the brake relieving signal AVHR of the rear wheel 11a on the low side disappears. The above described predetermined time is made the delay time set in the ON delay times 115a, 115b, in the second modification.

However, the predetermined time may be changed in accordance with the generating time of the brake relieving signal of the rear wheel 11a on the low side in the last control cycle.

Figure 11:
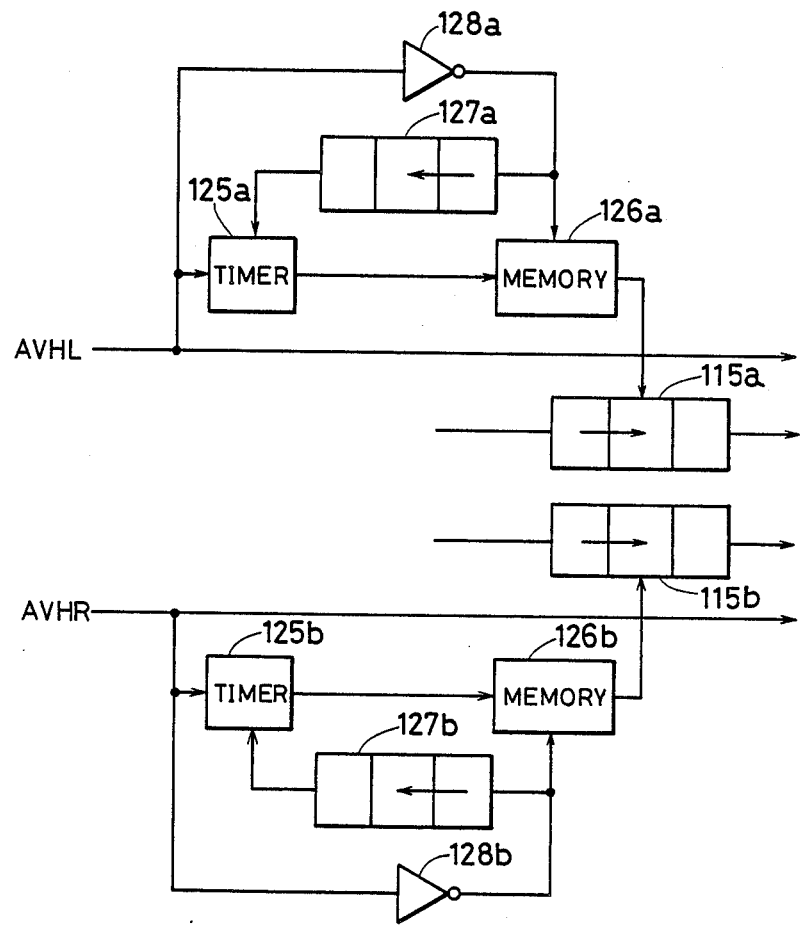
FIG. 11 is a circuit diagram of an important part of a third modification of the logic circuit of FIG. 6.

FIG. 11 shows such a third modification of this embodiment. Other parts are the same as the circuit of FIG. 6.

In this modification, timers 125a and 125b, memories 126a and 126b, second ON delay timers 127a and 127b, and NOT gates 128a and 128b are added to the circuits of FIG. 6 and FIG. 10.

In the last control cycle, the timer 125b operates with the generation of the brake relieving signal AVHR of the rear wheel 11a on the low side. The generating time of the signal AVHR is measured by the timer 125b. When the signal AVHR disappears, the output of the NOT gate 128b becomes "1", and it is supplied to the memory 126b. Thus, the measurement result is transferred to the memory 126b, and is memorized there. The output of the ON delay timer 127b becomes "1" in the delay time of the ON delay timer 127b after the output of the NOT gate 128b becomes "1". The measurement time set in the timer 125b is erased with the output of the ON delay timer 127a. The timer signal memorized in the memory 126b is supplied to the ON delay timer 115b. The delay time proportional to the time signal is set in the ON delay timer 115b.

In the first modification (FIG. 9) of this embodiment, the low side is changed over in the case that the rear wheel 11b on the high side generates continuously the brake relieving signal for a longer time than the predetermined time during the time that the rear wheel 11a on the low side is rotating in the stable region of the $\mu$-slip characteristics. The above predetermined time is made the delay time set in the ON delay timers 121a, 121b. However, the delay time may be changed in accordance with the brake relieving time of the rear wheel 11a on the low side in the last control cycle.

Figure 12:
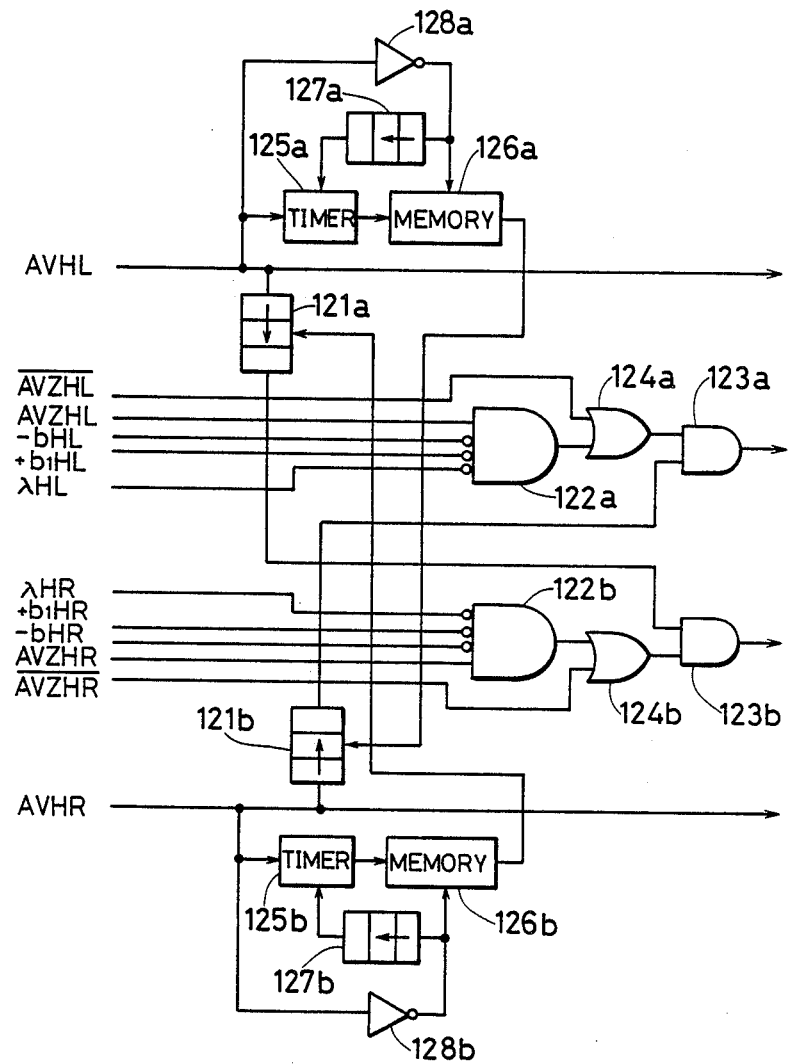
FIG. 12 is a circuit diagram of an important part of a fourth modification of the logic circuit of FIG. 6.

FIG. 12 shows such a fourth modification of this embodiment as to obtain the above operation. Other parts are the same as the circuit of FIG. 6. Parts in FIG. 12 which correspond to those in FIG. 9 and 11, are denoted by the same reference numerals.

In FIG. 12, it is clear that the delay time of the ON delay timers 121a, 121b can be changed in accordance with the brake relieving time of the rear wheel 11a on the low side in the last control cycle, in the same manner as the described operations of the circuit of FIG. 11.

According to a fifth modification of this embodiment, when the rear wheel 11a on the low side is rotating continuously for a longer time than a predetermined time in the stable region of the $\mu$-slip characteristics, the side which generates sooner the brake maintaining signal or brake relieving signal than the other side, with respect to the rear wheels, is newly made "low side". That can be effected with the circuit of FIG. 13.

Figure 13:
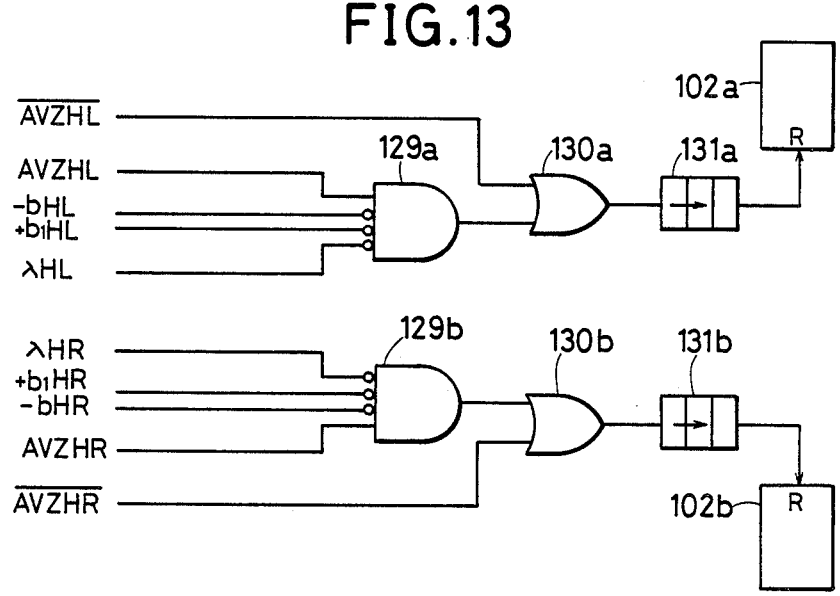
FIG. 13 is a circuit diagram of an important part of a fifth modification of the logic circuit of FIG. 6.

In FIG. 13, the signals AVZHL and AVZHR are supplied to first input terminals of AND gates 129a and 129b. Further, the signals $-$bHL, $-$bHR, $+b_1$HL, $+b_1$HR and $\lambda$HR, $\lambda$HR are supplied to second, third and fourth negation input terminals of the AND gates 129a and 129b. Output terminals of the AND gates 129a and 129b are connected to one input terminals of OR gates 130a and 130b. The signals $\overline{\text{AVZHL}}$ and $\overline{\text{AVZHR}}$ are supplied to the other input terminals of the OR gates 130a and 130b. Output terminals of the OR gates 130a and 130b are connected though ON delay timers 131a and 132b to the reset terminals of the flip-flops 102a and 102b of FIG. 6.

When the rear wheel on the low side is rotating continuously in the stable region of the $\mu$-slip characteristics for a longer time than the delay time of the ON delay timers 131a and 131b, the flip-flops 102a or 102b is reset, and put into the initial condition. Thus, the side of the rear wheel which sooner generates the brake maintaining signal or brake relieving signal, is newly made "low side". Hereafter, the above described operations are effected.

According to sixth modification, when the rear wheel on the low side generates continuously the brake increasing signal for a longer time than a predetermined time, the side of the rear wheel which generates sooner the brake maintaining signal or brake relieving signal than other, is newly made "low side". That can be effected with the circuit of FIG. 14.

Figure 14:
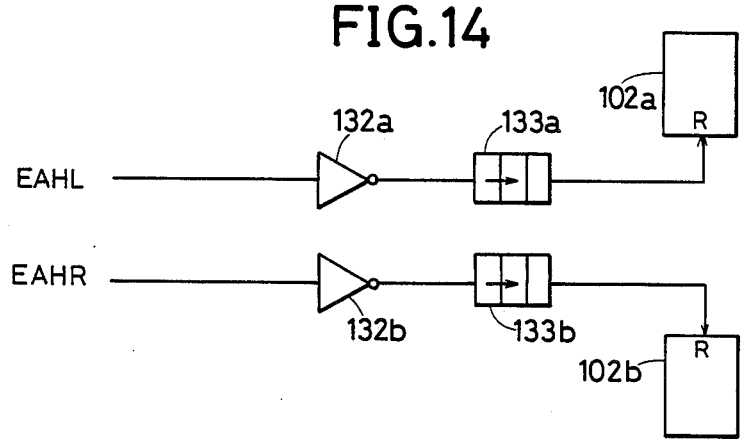
FIG. 14 is a circuit diagram of an important part of a sixth modification of the logic circuit of FIG. 6.

In FIG. 14, the signals EAHL and EAHR are supplied to NOT gates 132a and 132b. Output terminals of the NOT gates 132a and 132b are connected through ON delay timers 133a and 133b to the reset terminals R of the flip-flops 102a and 102b.

When the rear wheel on the low side generates continuously the brake increasing signal for a longer time than the delay time of the ON delay timers 133a or 133b, the flip-flop 102a or 102b is reset and put into the initial condition. And it is newly judged which side of the road is "low side". Other part are the same as the circuit of FIG. 6.

According to seventh modification of this invention, the "low side" is changed over in the case that the rear wheel on the high side generates the brake relieving signal during the time that both of the front and rear wheels on the low side are rotating in the stable region of the $\mu$-slip characteristics. That can be effected with the circuit of FIG. 15. Other parts are the same as the circuit of FIG. 6.

Figure 15:
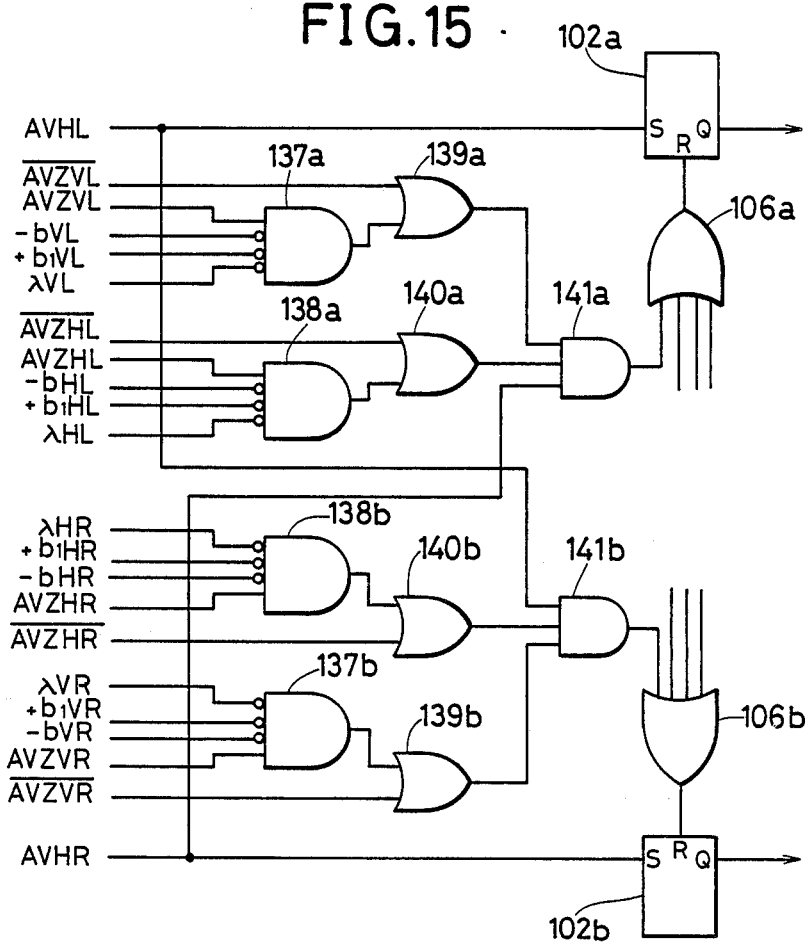
FIG. 15 is a circuit diagram of an important part of a seventh modification of the logic circuit of FIG. 6.

In FIG. 15, the signals $-$bVL, $-$bVR, $+b_1$VL, $+b_1$VR, and $\lambda$VL, $\lambda$VR, of the front wheels, are supplied to second, third and fourth negation input terminals of AND gates 137a and 137b, respectively. And the signals AVZVL and AVZVR of the front wheels are supplied to first input terminals of the AND gates 137a and 137b. Output terminals of the AND gates 137a and 137b are connected to one input terminals of OR gates 139a and 139b. The signals $-$bHL, $-$bHR, $+b_1$HL, $+b_1$HR, and $\lambda$HL, $\lambda$HR, of the rear wheels, are supplied to second, third and fourth negation input terminals of AND gates 138a and 138b, respectively. And the signals AVZHL and AVZHR of the rear wheels are supplied to first input terminals of the AND gates 138a and 138b. Output terminals of the AND gates 138a and 138b are connected to one input terminals of OR gates 140a and 140b.

The signals $\overline{\text{AVZVL}}$, $\overline{\text{AVZVR}}$, $\overline{\text{AVZHL}}$ and $\overline{\text{AVZHR}}$ are supplied to other input terminals of the OR gates 139a, 139b, 140a and 140b. Output terminals thereof are connected to first input terminals of AND gates 141a and 141b. Output terminals of the OR gates 140a and 140b are connected to second input terminals of the AND gates 141a and 141b. The signals AVHR and AVHL are supplied to third input terminals thereof. Output terminals of the AND gates 141a and 141b are connected to input terminals of the OR gates 106a and 106b.

Now it is assumed that the right side of the road is "low side", and that both of the front and rear wheels on the low side are rotating in the stable region of the $\mu$-slip characteristics.

At that time, the outputs of the AND gates 138b, 137b become "1". The rear wheel on the high side generates the brake relieving signal AVHL, so that the output of the AND gate 141b becomes "1", and the flip-flop 102b is put into the reset condition. Accordingly, the other flip-flop 102a are released from the reset condition, and put into the set condition with the signal AVHL. Thus, the "low side" is changed over. This modification is effective for the case that the vehicle runs on the meandering or slalom road.

According to eighth modification of this embodiment, the braking force of the low side is rapidly increased during the time any one of the rear wheels 11a and 11b are rapidly accelerated beyond the second acceleration threshold. That can be effected with the circuit of FIG. 16. Other parts are the same as the circuit of FIG. 6.

An OR gate 143 and an AND gate 144 are added to the circuit of FIG. 6. The signals $+b_2$HL and $+b_2$HR are supplied to input terminals of the OR gate 143. An output thereof is connected to a negation input terminal of the AND gates 144. The signal EVH is supplied to another input terminal of the AND gate 144. An output terminal thereof is connected to the input terminals of the AND gates 104a and 104b.

Figure 16:
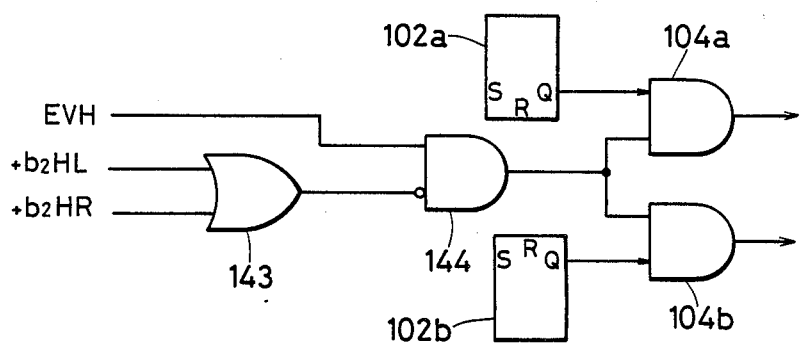
FIG. 16 is a circuit diagram of an important part of an eighth modification of the logic circuit of FIG. 6.

In FIG. 16, it is assumed that the right side of the road is "low side". When the signal EVH is generated, the output of the AND gate 104b becomes "1", and the output signal EV becomes "1". The braking forces to the right front and rear wheels 6a and 11b are maintained at constant. When any one of the rear wheels 11a and 11b are rapidly accelerated beyond the second acceleration threshold at a certain time, the output of the OR gate 143 becomes "1". Accordingly the output of the AND gate 144 becomes "0", and the braking forces to the low side wheels are rapidly increased. Thus, the braking distance can be shortened much.

While the preferred embodiment has been described, variations thereto will occur to those skilled in the art within the scope of the present inventive concepts which are delineated by the following claims.

What is claimed is:

1. In an anti-skid control apparatus for a vehicle braking system including:
   (A) a pair front wheels, and a pair of rear wheels;
   (B) wheel speed sensors associated with said wheels, respectively;
   (C) a first fluid pressure control valve device for controlling the brake fluid pressure of the wheel cylinder of one of said front wheels, arranged between a first fluid pressure generating chamber of a tandem master cylinder and said wheel cylinder of the one front wheel;
   (D) a second fluid pressure control valve device for controlling the brake fluid pressure of the wheel cylinder of another of said front wheels, arranged between a second fluid pressure generating chamber of said tandem master cylinder and said wheel cylinder of the other front wheel;
   (E) a control unit receiving outputs of said wheel speed sensors for measuring or judging the skid conditions of said front and rear wheels and for generating instructions for controlling said first and second fluid pressure control valve devices; and
   (F) a valve apparatus for generating a fluid pressure in accordance with the lower one of the brake fluid pressures of said front wheels controlled with said first and second fluid pressure control valve devices, being arranged between said wheel cylinders of the front wheels and those of the rear wheels; the improvements in which said control unit discriminates the frictionally lower one (designated as "low side") of the sides of the road on which said wheels are running, on the basis of the measuring or judging results of the skid conditions of said rear wheels, combines logically the measuring or judging results of the skid conditions of said rear wheels with the measuring or judging result of the skid condition of the one front wheel running on the low side for generating the instruction for controlling said first or second fluid pressure control valve device, and generates the instruction for controlling said second or first fluid pressure control valve device, on the basis of the measuring or judging result of the skid condition of the other front wheel running on the high side (frictionally higher side) independently of those of said rear wheels.

2. An anti-skid control apparatus according to claim 1, in which said measuring or judging results of the skid conditions include a brake increasing signal, a brake maintaining or holding signal and a brake relieving signal, and the side of the one rear wheel which generates said brake maintaining signal sooner than the other rear wheel, is made "low side", before anyone of said rear wheels generates said brake relieving signal.

3. An anti-skid control apparatus according to claim 1, in which said measuring or judging results of the skid conditions include a brake increasing signal, a brake maintaining or holding signal and a brake relieving signal, and the side of the one rear wheel which generates said brake relieving signal sooner than the other rear wheel, is made "low side".

4. An anti-skid control apparatus according to claim 3, in which said "low side" is changed over in the case that said one rear wheel on the low side is rapidly accelerated beyond a predetermined acceleration threshold during the time when said other rear wheel on the high side generates said brake relieving signal.

5. An anti-skid control apparatus according to claim 3, in which said "low side" is changed over in the case that said other rear wheel on the high side generates continuously said brake relieving signal for a longer time than a predetermined time during the time when said one rear wheel on the low side is rotating in the stable region of the $\mu$ (frictional coefficient) - slip characteristics.

6. An anti-skid control apparatus according to claim 3, in which said "low side" is changed over in the case that said other rear wheel on the high side generates continuously said brake relieving signal for a longer time than a predetermined time during the time when said brake relieving signal of the one rear wheel on the low side disappears.

7. An anti-skid control apparatus according to claim 6, in which said predetermined time is changed in accordance with the continuation time of said brake relieving signal of the one rear wheel on the low side in the last control cycle, or of the brake relieving signal obtained from the result of the select-low calculation of both said rear wheels.

8. An anti-skid control apparatus according to claim 2, in which, when said one rear wheel on the low side has rotated continuously in the stable region of the $\mu$-slip characteristics for a longer time than a predetermined time, the side of the one rear wheel which generates said brake maintaining signal sooner than the other rear wheel, is newly made "low side", before anyone of said rear wheels generates said brake relieving signal.

9. An anti-skid control apparatus according to claim 3, in which, when said one rear wheel on the low side has rotated continuously in the stable region of the $\mu$-slip characteristics for a longer time than a predetermined time, the side of the one rear wheel which generates said brake relieving signal sooner than the other rear wheel, is newly made "low side".

10. An anti-skid control apparatus according to claim 2, in which said measuring or judging results of the skid conditions further includes a brake step-wisely increasing signal, and when the number of the steps of said brake step-wisely increasing signal for said one rear wheel on the low side has reached a predetermined value, the side of the one rear wheel which generates said brake maintaining signal sooner than the other rear wheel, is newly made "low side", before anyone of said rear wheels generates said brake relieving signal.

11. An anti-skid control apparatus according to claim 3, in which said measuring or judging results of the skid conditions further includes a brake step-wisely increasing signal, and when the number of the steps of said brake step-wisely increasing signal for said one rear wheel on the low side has reached a predetermined value, the side of the one rear wheel which generates said brake relieving signal sooner than the other rear wheel, is newly made "low side".

12. An anti-skid control apparatus according to claim 2, in which, when said one rear wheel on the low side generates continuously said brake increasing signal for a longer time than a predetermined time, the side of the one rear wheel which generates said brake maintaining signal sooner that the other rear wheel, is newly made "low side", before anyone of said rear wheels generates said brake relieving signal.

13. An anti-skid control apparatus according to claim 3, in which, when said one rear wheel on the low side generates continuously said brake increasing signal for a longer time than a predetermined time, the side of the one rear wheel which generates said brake relieving signal sooner that the other area wheel, is newly made "low side".

14. An anti-skid control apparatus according to claim 3, in which said "low side" is changed over in the case that said other rear wheel on the high side generates said brake relieving signal during the time when both of said front and rear wheels on the low side is rotating in the stable region of the $\mu$-slip characteristics.

15. An anti-skid control apparatus according to claim 1, in which, while any one of said rear wheels is rapidly accelerated beyond a predetermined acceleration threshold, the braking force to said low side is rapidly increased.

16. An anti-skid control apparatus according to claim 1, in which said control unit forms a first select-low control signal on the basis of the measuring or judging results of the skid conditions of both said rear wheels and a second select-low control signal on the basis of said first select-low control signal and measuring or judging result of the one front wheel on said low side, and, on the basis of said second select-low control signal, generates the instruction for controlling said first or second fluid pressure control valve device, and generates the instruction for controlling said second or first fluid pressure control valve device, on the basis of the measuring or judging result of the skid condition of the other front wheel running on the high side (frictionally higher side) independently of those of said rear wheels.

* * * * *